(12) United States Patent
Fujii et al.

(10) Patent No.: US 7,574,072 B2
(45) Date of Patent: Aug. 11, 2009

(54) APPARATUS AND METHOD FOR PROCESSING INFORMATIONAL SIGNAL AND PROGRAM FOR PERFORMING THE METHOD THEREFOR

(75) Inventors: Takeyuki Fujii, Tokyo (JP); Tetsujiro Kondo, Tokyo (JP); Masashi Uchida, Tokyo (JP); Kazutaka Ando, Kanagawa (JP); Tomohiro Yasuoka, Tokyo (JP)

(73) Assignee: Sony Corporation, Tokyo (JP)

( * ) Notice: Subject to any disclaimer, the term of this patent is extended or adjusted under 35 U.S.C. 154(b) by 958 days.

(21) Appl. No.: 10/939,291

(22) Filed: Sep. 10, 2004

(65) Prior Publication Data

US 2005/0084233 A1      Apr. 21, 2005

(30) Foreign Application Priority Data

Sep. 12, 2003    (JP) .............................. 2003-322096

(51) Int. Cl.
   *H04N 7/01* (2006.01)
(52) U.S. Cl. ....................................... 382/300; 348/441
(58) Field of Classification Search ................ 382/300; 348/441, E7.014, E7.016, E5.109, 458, E5.108, 348/E5.111, E5.114, E5.077, 554; 338/195, 338/308, 320; 29/620; 623/905; 399/50; 700/55, 33
   See application file for complete search history.

(56) References Cited

U.S. PATENT DOCUMENTS

| | | | | |
|---|---|---|---|---|
| 5,369,441 A | * | 11/1994 | Enari | 348/559 |
| 5,436,653 A | * | 7/1995 | Ellis et al. | 725/22 |
| 5,517,588 A | * | 5/1996 | Kondo | 382/300 |
| 5,727,116 A | * | 3/1998 | Sato et al. | 386/122 |
| 6,342,925 B1 | * | 1/2002 | Akhavan et al. | 348/563 |
| 6,384,773 B1 | * | 5/2002 | Martin et al. | 342/202 |
| 6,529,637 B1 | * | 3/2003 | Cooper | 382/267 |
| 6,539,320 B1 | * | 3/2003 | Szajnowski et al. | 702/79 |

(Continued)

FOREIGN PATENT DOCUMENTS

EP        0 989 748        3/2000

(Continued)

OTHER PUBLICATIONS

Patent Abstracts of Japan, Publication No. 08-051599, Publication Date Feb. 20, 1996.

(Continued)

*Primary Examiner*—Sheela C Chawan
(74) *Attorney, Agent, or Firm*—Frommer Lawrence & Haug LLP; William S. Frommer; Paul A. Levy

(57) ABSTRACT

An informational signal processing apparatus comprising an adjustment device that permits a user to adjust a space resolution adjustment value and a time resolution adjustment value output uninterruptedly. From the adjustment values output to the testing terminal, an acquisition device acquires a final adjustment value through a series of adjustments of these adjustment values and an adjustment value in a process of changes all the way to this final adjustment value and transmits them to an accumulation device. The accumulation device stores a final adjustment value through each series of adjustment and history information related to a process of changes in adjustment value all the way to the final adjustment value. Based on the history information, reliability of the final adjustment value can be decided.

15 Claims, 19 Drawing Sheets

U.S. PATENT DOCUMENTS

| | | | | |
|---|---|---|---|---|
| 6,987,539 B2 * | 1/2006 | Kondo et al. | ................. | 348/441 |
| 7,020,304 B2 * | 3/2006 | Alattar et al. | ................ | 382/100 |
| 7,055,166 B1 * | 5/2006 | Logan et al. | .................... | 725/32 |
| 2002/0135594 A1 | 9/2002 | Kondo et al. | | |

FOREIGN PATENT DOCUMENTS

| | | |
|---|---|---|
| JP | 7 222078 | 8/1995 |
| JP | 8 123385 | 5/1996 |
| JP | 8 298627 | 11/1996 |
| JP | 9 37174 | 2/1997 |
| JP | 9-261549 | 10/1997 |
| JP | 11-232726 | 8/1999 |
| JP | 11-345446 | 12/1999 |
| JP | 2000-69435 | 3/2000 |
| JP | 2000-196970 | 7/2000 |
| JP | 2001-103406 | 4/2001 |
| JP | 2001-318745 | 11/2001 |
| JP | 2002-159077 | 5/2002 |
| JP | 2002-185912 | 6/2002 |
| JP | 2003 196970 | 7/2003 |
| WO | WO 01 17250 | 3/2001 |
| WO | WO 01 63921 | 8/2001 |
| WO | WO 02 03682 | 1/2002 |

OTHER PUBLICATIONS

Patent Abstracts of Japan, Publication No. 2001-238185, Publication Date Aug. 31, 2001.
Patent Abstracts of Japan, Publication No. 2003-224797, Publication Date Aug. 8, 2003.
Patent Abstracts of Japan, Publication No. 2003-224798, Publication Date Aug. 8, 2003.
Patent Abstracts of Japan, Publication No. 2003-224830, Publication Date Aug. 8, 2003.
Patent Abstracts of Japan, Publication No. 2003-339063, Publication Date Nov. 28, 2003.
Patent Abstracts of Japan, Publication No. 2004-040498, Publication Date Feb. 5, 2004.
Patent Abstracts of Japan, Publication No. 2004-056630, Publication Date Feb. 19, 2004.
Patent Abstracts of Japan, Publication No. 2001-309315, Publication Date Nov. 2, 2001.
Patent Abstracts of Japan, Publication No. 2001-309314, Publication Date Nov. 2, 2001.
Patent Abstracts of Japan, Publication No. 10-313445, Publication Date Nov. 24, 1998.
Patent Abstracts of Japan, Publication No. 08-130744, Publication Date May 21, 1996.

* cited by examiner

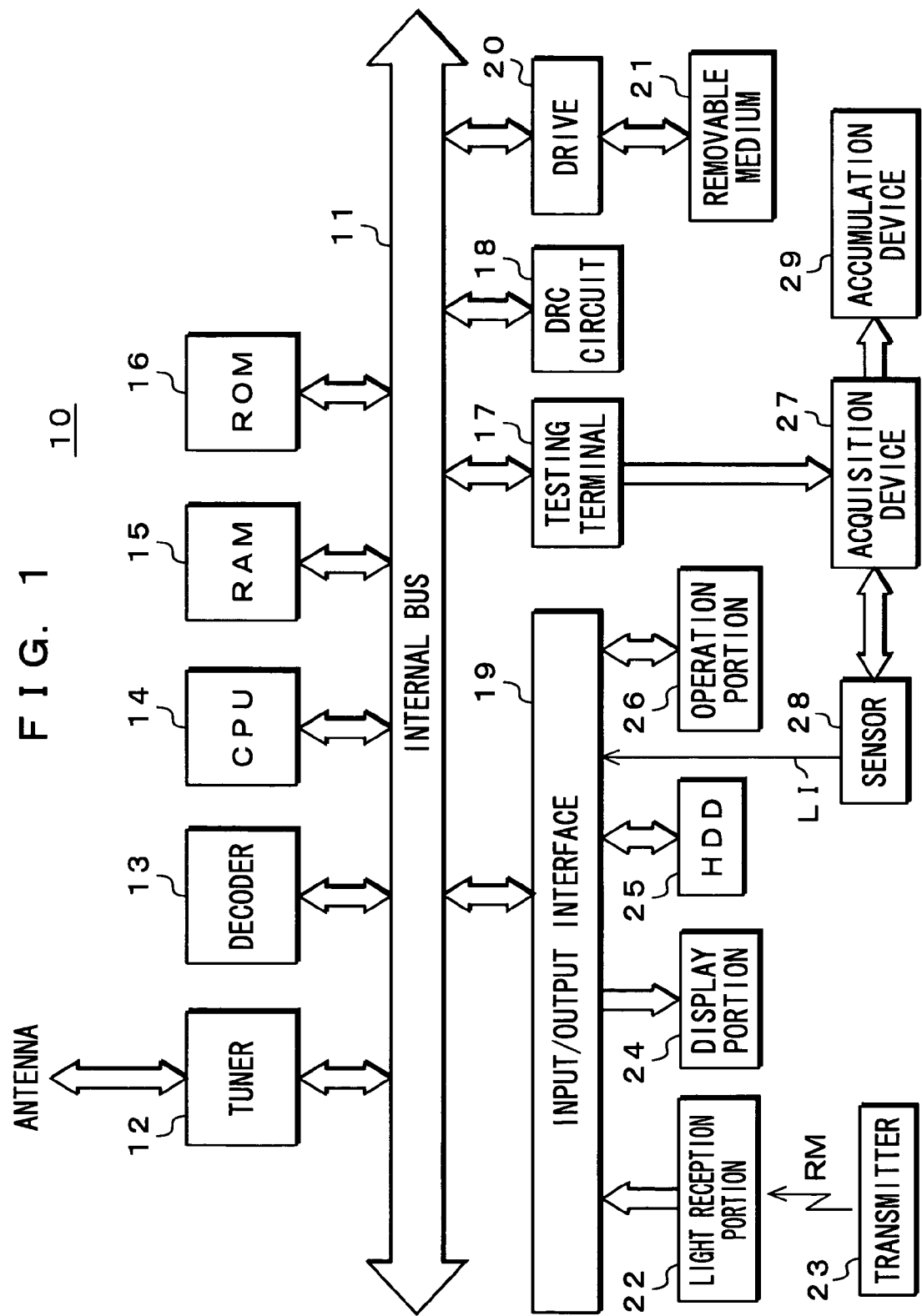

F I G. 7
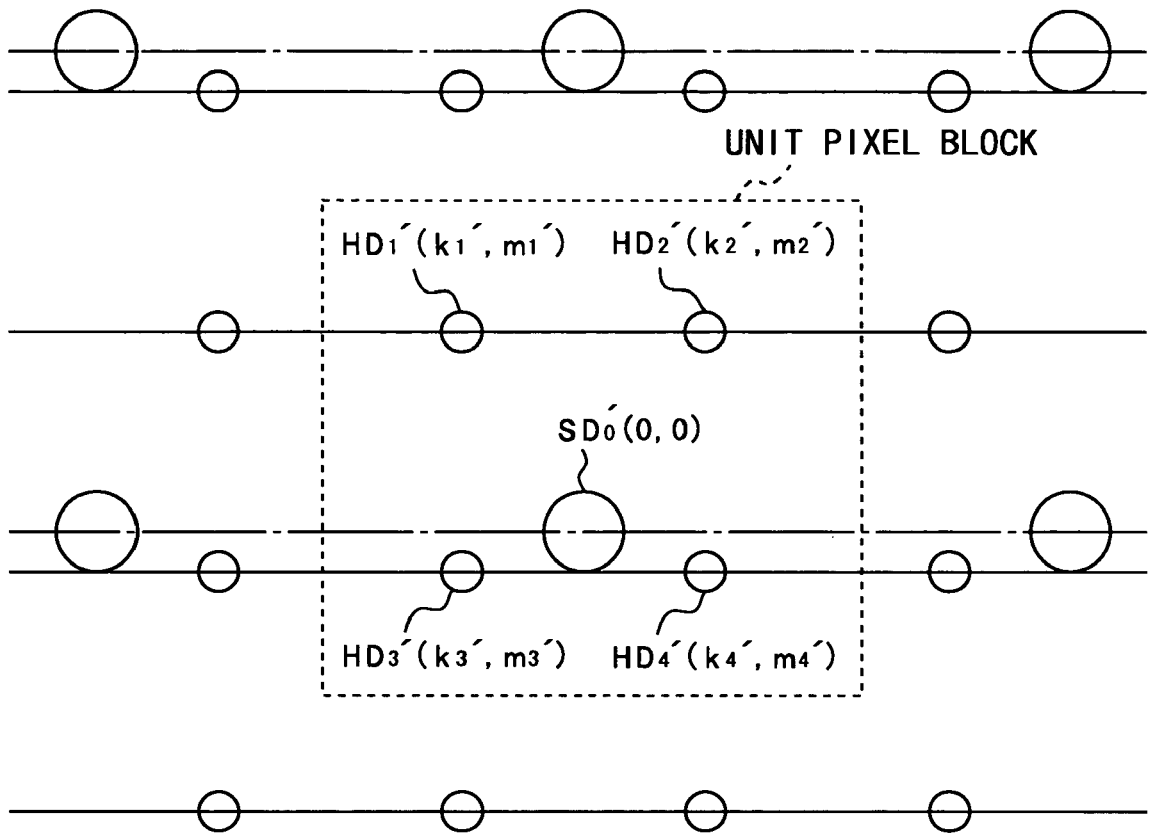

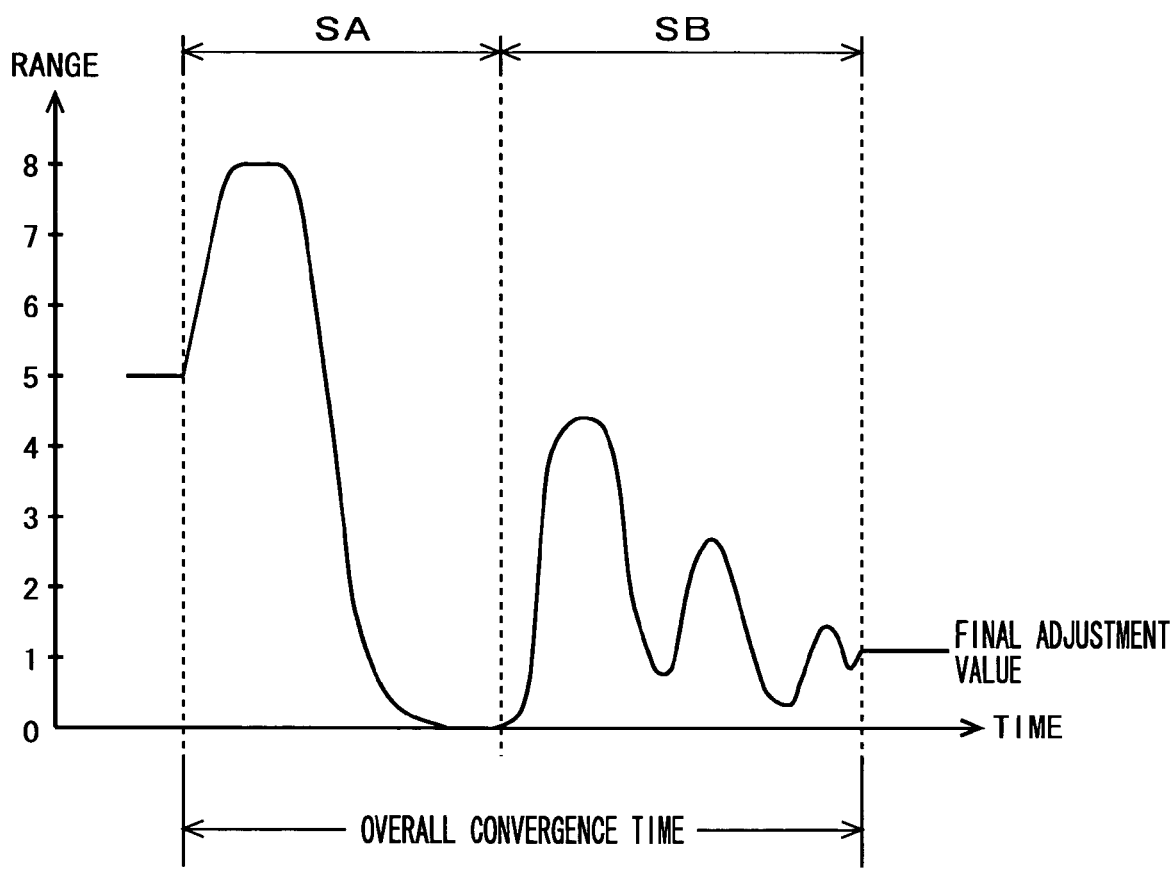

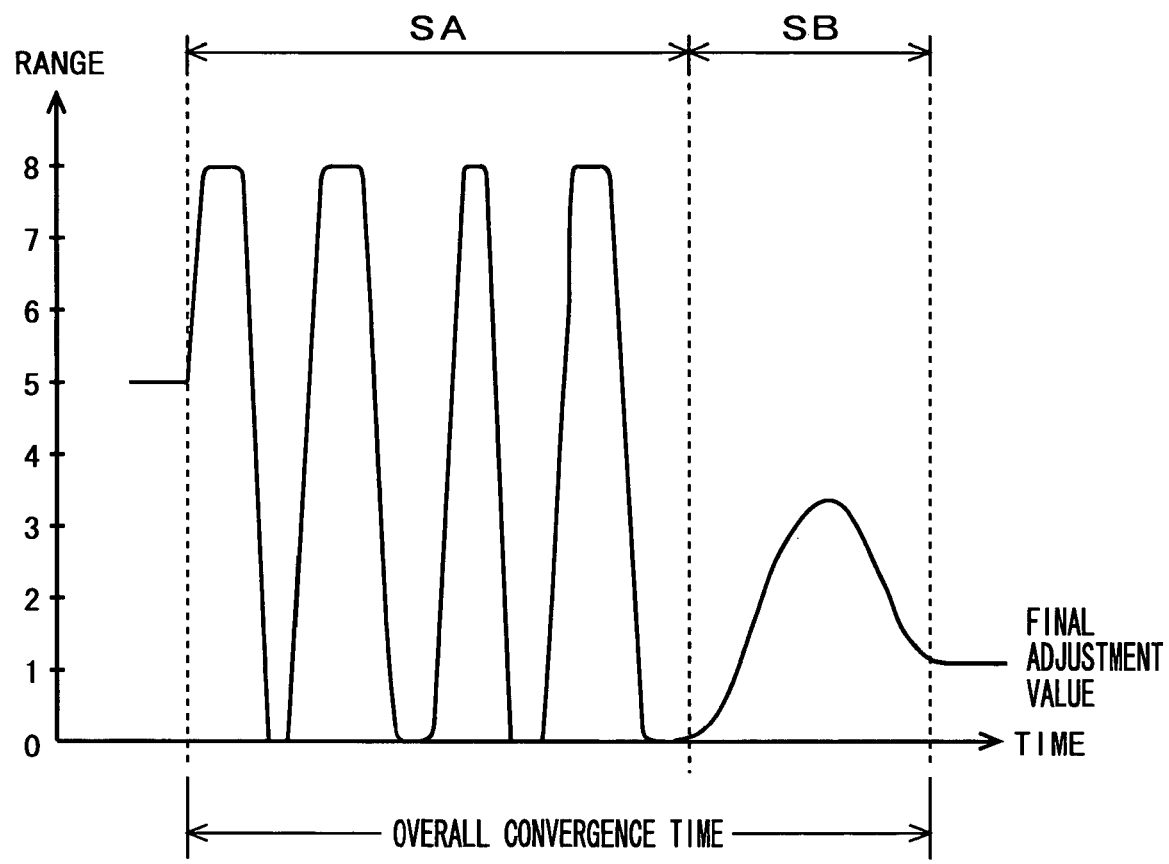

FIG. 14

| | FINAL ADJUSTMENT VALUE | HISTORY INFORMATION No.1 | HISTORY INFORMATION No.2 | HISTORY INFORMATION No.3 | ... | ENVIRONMENT INFORMATION No.1 | ENVIRONMENT INFORMATION No.2 | ... |
|---|---|---|---|---|---|---|---|---|
| DATA 1 | 1.6 | Type A | Type a | 14.5[sec] | ... | 23.4[lx] | 40.9[dB] | ... |
| DATA 2 | 4.0 | Type C | Type b | 6.7[sec] | ... | 30.8[lx] | 62.8[dB] | ... |
| DATA 3 | 2.0 | Type A | Type b | 10.4[sec] | ... | 25.2[lx] | 55.6[dB] | ... |
| DATA 4 | 4.2 | Type D | Type d | 14.5[sec] | ... | 27.3[lx] | 66.5[dB] | ... |
| DATA 5 | 1.9 | Type C | Type c | 9.8[sec] | ... | 19.2[lx] | 33.4[dB] | ... |
| - - - | | ← WAVEFORM SHAPE (REGION SA) | ← WAVEFORM SHAPE (REGION SB) | ← CONVERGENCE TIME | ... | ← BRIGHTNESS | ← NOISE | ... |

F I G. 1 5
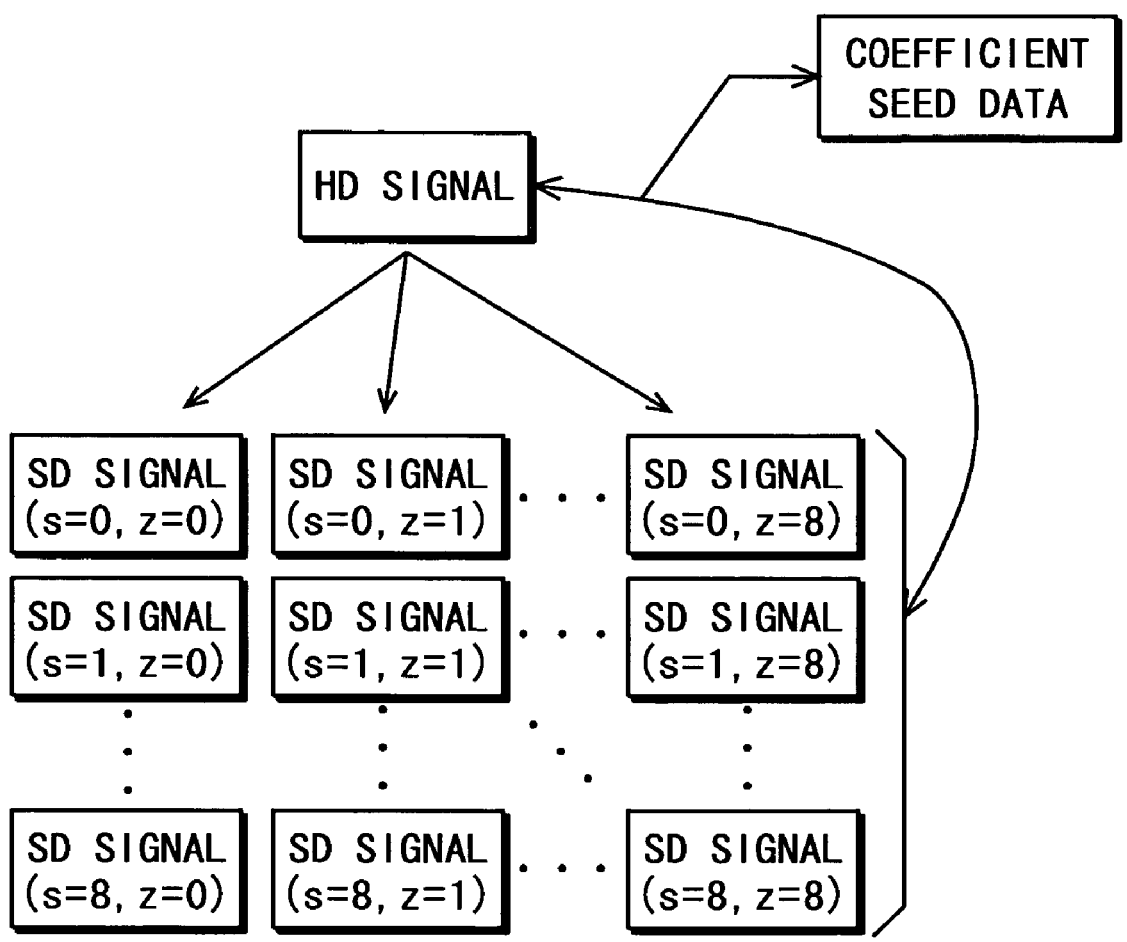

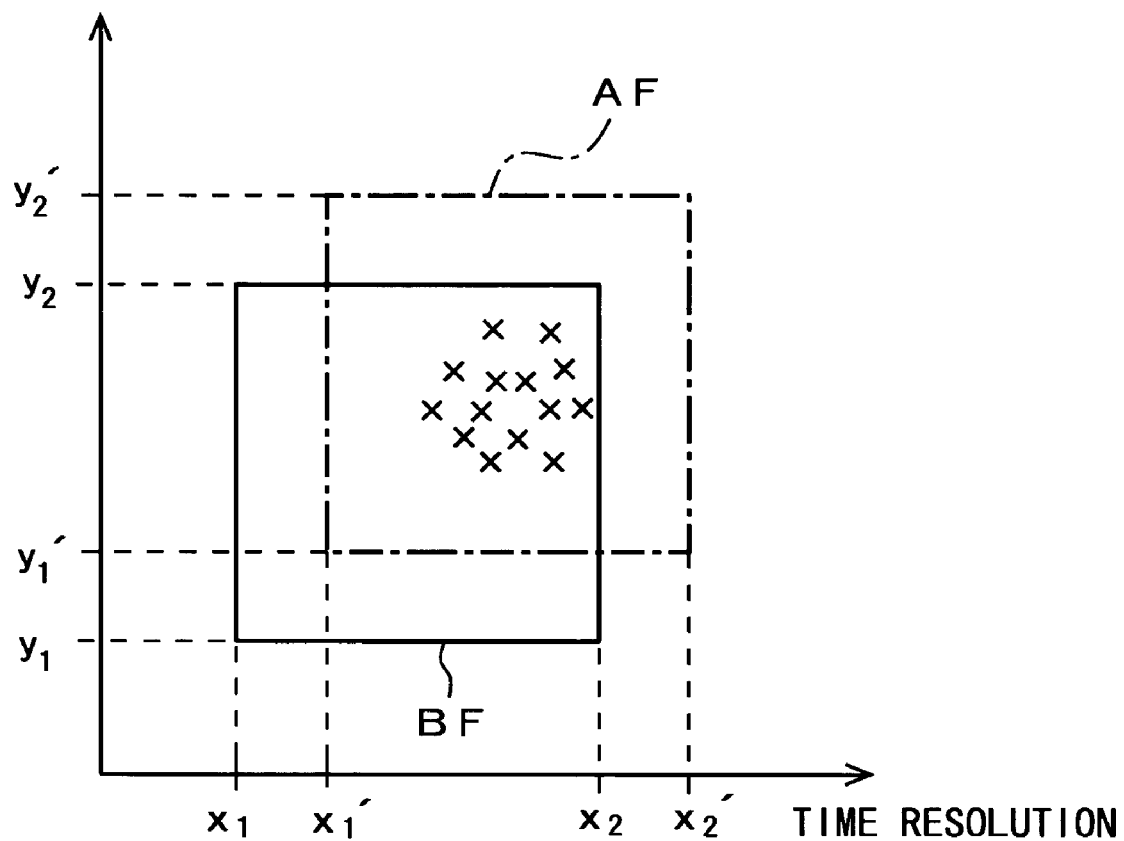
F I G. 1 7

APPARATUS AND METHOD FOR PROCESSING INFORMATIONAL SIGNAL AND PROGRAM FOR PERFORMING THE METHOD THEREFOR

BACKGROUND OF THE INVENTION

1. Field of the Invention

The present invention relates to an apparatus and a method for processing an informational signal and a program for performing the method therefor. More particularly, it relates to an apparatus for processing an informational signal such as TV receiver and the like.

2. Description of Related Art

Owing to increasing audio-visual oriented requirements in recent years, there has occurred a demand for a TV receiver that can obtain an image having a higher resolution, to meet which demand, a so-called high-definition TV (HDTV) has been developed. The HDTV has 1125 scanning lines, which number is more than twice the number of the scanning lines of 525 for an NTSC-scheme TV. Further, the HDTV has an aspect ratio of 9:16 in contrast of an aspect ratio of 3:4 of the NTSC-scheme TV. Therefore, the HDVT can display an image that has higher resolution and realistic sensations than the NTSC-scheme TV.

Although the HDTV has such excellent properties, it can display no images only by receiving an NTSC-scheme video signal as it is. This is because the NTSC-scheme TV and the HDTC have different standards as described above.

In view of the above, a converter for converting an NTSC-scheme video signal into an HDTV video signal in order to display the HDTV-scheme image in accordance with the NTSC scheme video signal has been disclosed (see Japanese Patent Application Publication No. H08-51599).

In such the converter, pixel data of a block (region) that corresponds to pixel data of a target position in a HDTV video signal is extracted from an NTSC-scheme video signal, so that based on a level distribution pattern of the pixel data of this block, a class to which the pixel data of this target position belongs is determined, in accordance to which class the pixel data of this target position is generated.

In this converter, a resolution of an image owing to an HDTV video signal is fixed. A user cannot give his or her preferred resolution that matches image contents etc. in contrast to the case of conventional adjustment of a contrast, sharpness, etc.

To solve this problem, has been proposed an apparatus for processing an informational signal that, when converting an NTSC-scheme video signal into an HDTV video signal, a user can generate the HDTV video signal in accordance with a value of an input parameter to freely adjust a resolution etc. of an image obtained by this HDTV video signal (see Japanese Patent Application Publication No. 2001-238185).

However, in such the apparatus for processing the informational signal, the user can freely adjust a resolution of an image, while its adjustment range is fixed. If a user makes adjustments mainly, for example, to one end side of this adjustment range, he or she cannot have a sufficient adjustment range. Therefore, it is desired that adjustments can be made that match the user's preferences.

It is an object of the present invention to provide an apparatus for processing an informational signal and the like that enables a final adjustment value obtained by user operations to be more efficiently utilized, thereby accurately making adjustments that match, for example, user preferences.

SUMMARY OF THE INVENTION

According to the present invention, the foregoing object is attained by an apparatus for processing an informational signal. The apparatus comprises adjustment means for permitting a user to adjust the informational signal that is input to make a quality of an output owing to the informational signal a predetermined quality. The apparatus also comprises storage means for storing to a storage medium a final adjustment value through a series of adjustments by means of the adjustment means and history information related to a process of changes in adjustment value up to this final adjustment value.

In accordance with another aspect of the invention, an apparatus for processing an informational signal comprises an adjustment unit for permitting a user to adjust the informational signal that is input to make a quality of an output owing to the informational signal a predetermined quality. This apparatus also comprises a storage unit for storing to a storage medium a final adjustment value through a series of adjustments by means of the adjustment unit and history information related to a process of changes in adjustment value up to this final adjustment value.

In accordance with further aspect of the invention, a method for processing an informational signal comprises a step of permitting a user to adjust the informational signal that is input to make a quality of an output owing to the informational signal a predetermined quality. The method also comprises a step of storing to a storage medium a final adjustment value through a series of adjustments by the user adjustment step and history information related to a process of changes in adjustment value up to this final adjustment value.

In accordance with other aspect of the invention, a computer program causes a computer to perform the above-mentioned method for processing the informational signal.

In the present invention, a user adjusts an informational signal that is input so that a quality of an output owing to the informational signal may be a predetermined quality. For example, the informational signal includes an image signal or an audio signal. If the informational signal is an image signal, the quality of output is a picture quality, so that adjustment of the picture quality means adjusting a resolution, noise suppression degree, luminance, hue, color saturation, etc. If the informational signal is an audio signal, on the other hand, it means adjusting increase and decrease of high and low pitch sound, noise suppression degree, sound volume etc.

If adjustments are made by the user as described above, a final adjustment value in the series of adjustments is stored to a storage medium and, further, history information related to a process of changes in adjustment value up to this final adjustment value is stored to the storage medium with it being paired with the final adjustment value.

For example, the process of changes in the adjustment value is divided into a first region that corresponds to a period when the user confirms the quality of the output and a second region that corresponds to a period when the user adjusts to making the quality of the output a predetermined quality. The history information includes the information related to these first and second regions.

In this case, the final adjustment value and the history information are acquired from, for example, a body of a device for adjusting the input information signal etc. The final adjustment value and the history information are also acquired from transmission means that remote-controls operations of the body of the device for adjusting, for example, the informational signal that is input.

In such a manner, the storage medium stores a final adjustment value of each series of adjustments. Since this final adjustment value is data indicative of user preferences, it is possible, for example, to determine an adjustment range using this final adjustment value, thus adjusting a quality of an output so that it may match user preferences.

In this case, to the storage medium, the final adjustment value and history information related to a process of changes in adjustment value up to this adjustment value are stored. For example, based on this history information, such reliability that a final adjustment value indicates user's preferences can be guessed. Therefore, in a case where a final adjustment value is used as described above, this final adjustment value can be weighted on the basis of the history information, thereby properly adjusting quality of the output so that it may match user preferences.

In accordance with still further aspect of the invention, an apparatus for processing an informational signal comprises adjustment means for permitting a user to adjust the informational signal that is input to make a quality of an output owing to the informational signal a predetermined quality and information acquisition means for acquiring information on an environment in surroundings of the user. The apparatus also comprises storage means for storing to a storage medium a final adjustment value through a series of adjustments by means of the adjustment means and the environment information acquired by the information acquisition means when this series of adjustments have been made, with them being paired with each other.

In accordance with still another aspect of the invention, an apparatus for processing an informational signal comprises an adjustment unit for permitting a user to adjust an informational signal that is input to make a quality of an output owing to the informational signal a predetermined quality and an information acquisition unit for acquiring information on an environment in surroundings of the user. The apparatus also comprises a storage unit for storing to a storage medium a final adjustment value through a series of adjustments by means of the adjustment unit and the environment information acquired by the information acquisition unit when this series of adjustments have been made, with them being paired with each other.

In accordance with additional aspect of the invention, a method for processing an informational signal comprises a step of permitting a user to adjust the informational signal that is input to make a quality of an output owing to the informational signal a predetermined quality and a step of acquiring information of an environment in surroundings of the user. The method also comprises a step of storing to a storage medium a final adjustment value through a series of adjustments by the user adjustment step and the environment information acquired by the information acquisition step when this series of adjustments have been made, with them being paired with each other.

In accordance with still further aspect of the invention, a computer program causes a computer to perform the above-mentioned informational signal processing method.

In the present invention, a user adjusts an informational signal that is input so that a quality of an output owing to the signal may be a predetermined quality. For example, the informational signal may be an image signal or an audio signal. If adjustments are made by the user as described above, a final adjustment value in the series of adjustments is stored to a storage medium and, further, environment information acquired through this series of adjustments is stored to the storage medium. This environment information is, for example, brightness, noise, etc. in the user's surroundings.

In such a manner, the storage medium stores a final adjustment value of each series of adjustments. Since this final adjustment value is data indicative of user preferences, it is possible, for example, to determine an adjustment range using this final adjustment value, thus adjusting a quality of an output so that it may match user preferences.

In this case, to the storage medium, the final adjustment value and the environment information in the user's surroundings are stored. Therefore, in a case where a final adjustment value is used as described above, this final adjustment value can be classified into groups based on the environment information and used to determine the above-mentioned adjustment range for each of the groups, thereby properly adjusting a quality of the output so that it may match user preferences.

According to the present invention, in a case where a user adjusts the informational signal that is input to make a quality of an output owing to this informational signal a predetermined quality, a final adjustment value through a series of adjustments and history information related to a process of changes in adjustment value up to this final adjustment value or information of an environment in surroundings of the user are stored to a storage medium. This allows the final adjustment value to be utilized more effectively, thus properly performing adjustments that match the user's preferences, for example.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 1 is a block diagram for showing a configuration of a TV receiver according to an embodiment of the invention;

FIG. 7 is a diagram for showing a phase lag (in an even-numbered field) from a center prediction tap of four pixels in a unit pixel block of the HD signal (1050i signal);

FIG. 12 is a graph diagram for showing another example of changes in adjustment value through a series of adjustments;

FIG. 13 is a graph diagram for showing a further example of changes in adjustment value through a series of adjustments;

FIG. 14 is a table diagram for showing an acquisition information table formed in the accumulation device;

FIG. 15 is a diagram for showing one example of a method for generating coefficient seed data;

FIG. 17 is a graph diagram for explaining changes in resolution adjustment range;

DETAILED DESCRIPTION OF THE PREFERRED EMBODIMENTS

The following will describe preferred embodiments of the present invention with reference to drawings. FIG. 1 shows a configuration of an embodiment of a TV receiver 10 according to the invention.

This TV receiver 10 has a function to convert a broadcasting signal received by a tuner 12, that is, a standard definition (SD) signal referred to as a "525i signal" into a high definition (HD) signal referred to as a "1050i signal" and display an image based on this HD signal. It is to be noted that the 525i signal is an interlacing image signal with 525 lines and the 1050i signal is an interlacing image signal with 1050 lines.

Figure 2:
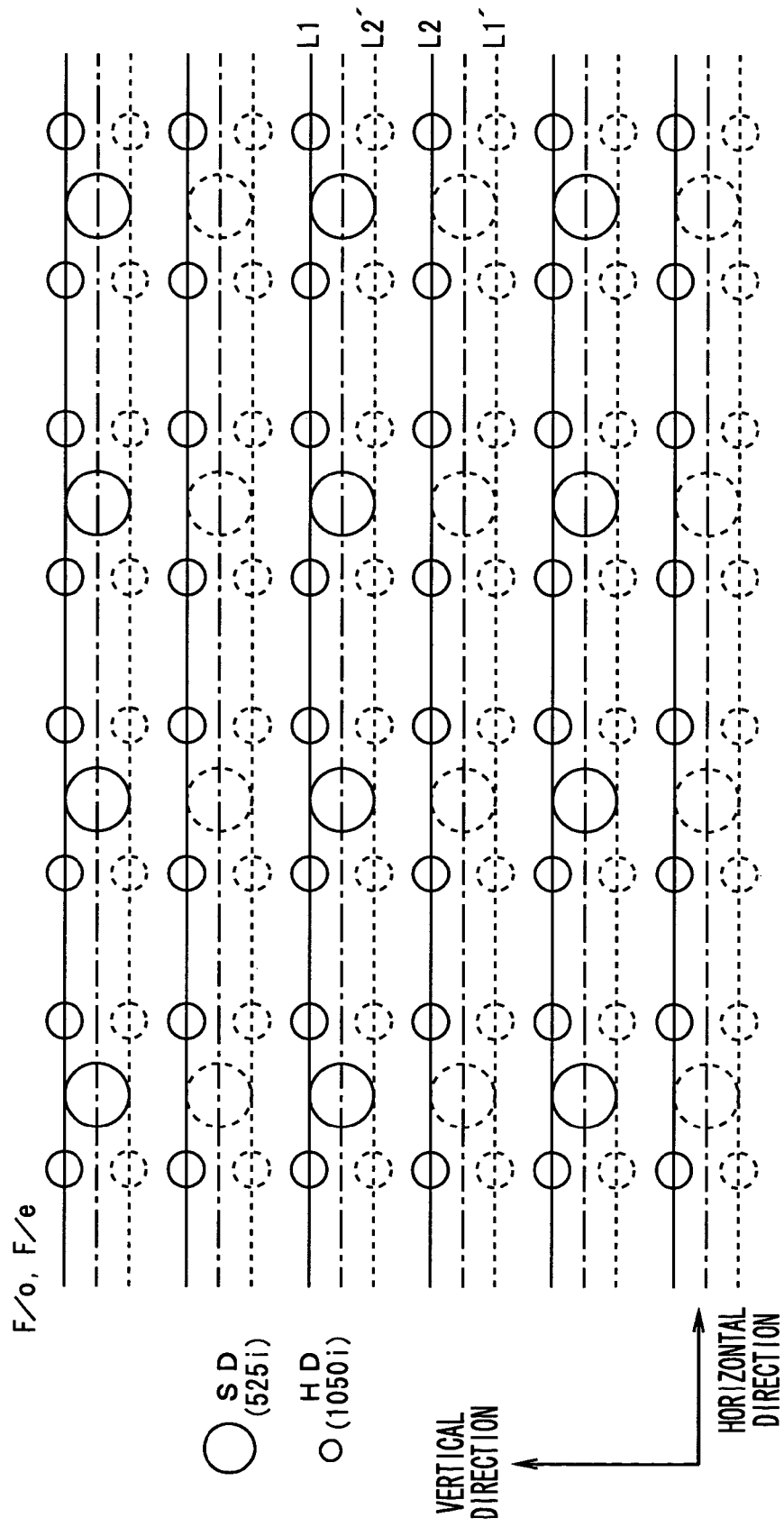
FIG. 2 is a diagram for showing a relationship in terms of a pixel position between a 525i signal and a 1050i signal.

FIG. 2 shows a relationship in terms of a pixel position of a frame (F) between the 525i signal and the 1050i signal, in which the pixel position of an odd-numbered (o) field is indicated by a solid line and that of an even-numbered (e) field is indicated by a broken line. A larger dot indicates a pixel of the 525i signal and a smaller dot indicates that of the 1050i signal. As can be seen from FIG. 2, as pixel data of the 1050i signal, there exist pieces of line data L1 and L1' near a line of the 525i signal and pieces of line data L2 and L2' remote from the line of the 525i signal. It is to be noted that L1 and L2 represent line data of an odd-numbered field and L1' and L2' represent line data of an even-numbered field. Further, the number of pixels of each line of the 1050i signal is twice that of each line of the 525i signal.

In this TV receiver 10, through an internal bus 11, the tuner 12, a decoder 13, a central processing unit (CPU) 14, a random access memory (RAM) 15, a read only memory (ROM) 16, a testing terminal 17, a digital reality creation (DRC) circuit 18, and an input/output interface 19 are connected to each other. Further, if necessary, a driver 20 is connected thereto. To the input/output interface 19, a light reception portion 22, a display portion 24, a hard disk drive (HDD) 25, an operation portion 26, and a sensor 28 are connected.

The light reception portion 22 receives an optical signal output when a user operates a remote-control transmitter 23. Further, the user can operate the operation portion 26 to input a command. The CPU 14 performs processing based on a received command. The user can operate, for example, the remote-control transmitter 23 to input an adjustment value for adjusting a picture quality of an image to be displayed at the display portion 24. In the present embodiment, the picture quality to be adjusted is, for example, a space resolution and a time resolution.

The CPU 14 performs a variety of processing items in accordance with a program stored in the ROM 16 or a program loaded from the HDD 25 into the RAM 15. Further, the RAM 15 appropriately stores data or the like, which is required when the CPU 14 performs various processing items. The HDD 25 stores the operating system (OS) and application programs executed by the CPU 14 as well as data based on a broadcasting signal received from the tuner 12.

When the light reception portion 22 receives an infrared signal RM from the remote-control transmitter 23 based on a user operation or the user inputs a command through the operation portion 26, the CPU 14 causes a broadcasting signal from a broadcast station, not shown, to be received by the tuner 12 and decoded by the decoder 13. The decoder 13 outputs an SD signal (525i signal) which is based on the decoded broadcasting signal, to the DRC circuit 18 via the internal bus 11.

The DRC circuit 18 receives the SD signal (525i signal) and converts this SD signal into an HD signal (1050i signal). In this process, the DRC circuit 18 adjusts the above-mentioned space resolution and time resolution of an image due to the HD signal based on adjustment values, s and z, commanded by the user, for the space resolution and the time resolution and information of an environment in surroundings of the user, which is acquired by the sensor 28. In the present embodiment, the environment information supplied to the DRC circuit 18 is, for example, Z information LI of brightness. It is to be noted that a configuration of the DRC circuit 18 will be described later with reference to FIG. 5.

The HD signal acquired by this DRC circuit 18 is output through the internal bus 11 and the input/output interface 19 to the display portion 24. The display portion 24 displays an image based on this HD signal. This display portion 24 is constituted of, for example, a cathode-ray tube (CRT) display, a liquid crystal display (LCD), a plasma display panel (PDP), etc.

To the testing terminal 17, the adjustment values, s and z for the above-mentioned space resolution and time resolution are output. An acquisition device 27 is connected to this testing terminal 17. Based on the adjustment values, s and z output to the testing terminal 17, the acquisition device 27 acquires a final adjustment value of each of these adjustment values through a series of adjustments by the user and an adjustment value in a process of changes up to each of these final adjustment values. The final adjustment values etc. acquired by this acquisition device 27 are sent to an accumulation device 29.

The information of the environment in the user's surroundings, which is acquired by the sensor 28 for each series of adjustments on the above-mentioned adjustment values, s and z, is sent via the acquisition device 27 to the accumulation device 29 and stored therein with them being correlated with the final adjustment value and the history information. It is to be noted that the piece(s) of the acquired information is (are) of one kind or a plurality of kinds. The environment information includes information on brightness, noise, an audio-visual distance, an audio-visual direction, a temperature, a humidity, a time, a radio wave condition, etc. It is to be noted that a configuration example of each of the acquisition device 27, the sensor 28, and the accumulation device 29 will be described later with reference to FIG. 8.

The internal bus 11 is connected to the drive 20 as necessary, to which a removable medium 21 constituted of a magnetic disk, an optical disc, a magneto-optical disc, or a semiconductor memory is mounted appropriately, so that a computer program read from it is installed to the HDD 25 as necessary.

The following will describe operations of the TV receiver 10 shown in FIG. 1.

A broadcasting signal received by the tuner 12 is supplied via the internal bus 11 to the decoder 13. The decoder 13 performs decoding processing, error correction processing, etc. on the broadcasting signal from the tuner 12, to obtain an SD signal (525i signal) based on this broadcasting signal. The SD signal obtained at this decoder 13 is supplied via the internal bus 11 to the DRC circuit 18.

The DRC circuit 18 performs processing to convert the SD signal from the decoder 13 into an HD signal (1050i signal). In this case, a space resolution and a time resolution of an image, which is based on the HD signal, are adjusted on the basis of an adjustment value, s for the space resolution and an adjustment value, z for the time resolution which are commanded by a user as well as information LI of brightness in the user's surroundings acquired by the sensor 28.

The HD signal obtained by this DRC circuit 18 is supplied via the internal bus 11 and the input/output interface 19 to the display portion 24. An image owing to this HD signal is displayed on a screen of the display portion 24.

To the testing terminal 17, the above-mentioned space resolution adjustment value, s and time resolution adjustment value, z are output uninterruptedly. These adjustment values, s and z are changed when the user makes adjustment as described above. From the adjustment values, s and z output to the testing terminal 17, the acquisition device 27 acquires a final adjustment value through a series of adjustments of these adjustment values, s and z and an adjustment value in a process of changes up to this final adjustment value. The final adjustment value etc. are sent to the accumulation device 29 and stored therein as a final adjustment value and as history information related to a process of changes in adjustment value up to the final adjustment as they are or in a condition where they are processed.

Further, for each series of adjustments on these adjustment values, s and z, information on an environment in the user's surroundings is acquired by the sensor 28. The acquired environment information is then sent via the acquisition device 27 to the accumulation device 29 and stored therein with it being correlated with the final adjustment value and the history information. In such a manner, the final adjustment value, the history information, and the environment information stored in the accumulation device 29 are utilized to, for example, generate coefficient seed data, wi0 through wi9 (i=1–n) to be stored in an information memory bank 135 of the DRC circuit 18 when a board including the circuit 18 is replaced to upgrade a version of the TV receiver 10, for example (see FIG. 5 described later).

In this case, the history information can be used to decide a reliability of the final adjustment value and the environment information can be used to decide which environment the final adjustment value is related to, thus effectively utilizing the final adjustment value.

The user can operate the remote-control transmitter 23 to adjust a space-directional resolution and a time-directional resolution of an image displayed on the screen of the display portion 24 as described above. The DRC circuit 18, as described later, calculates pixel data (hereinafter referred to as "HD pixel data" appropriately) that constitutes the HD signal, by using an estimate equation. As coefficient data for this estimate equation, pieces of data that correspond to adjustment values, s and z, which determine space-directional and time-directional resolutions adjusted by operating the remote-control transmitter 23 with the user, are generated by a generation equation having these adjustment values, s and z as parameters and used. Accordingly, space-directional and time-directional resolutions of an image due to the HD signal obtained by the DRC circuit 18 correspond to the adjustment values, s and z, respectively.

Figure 3:
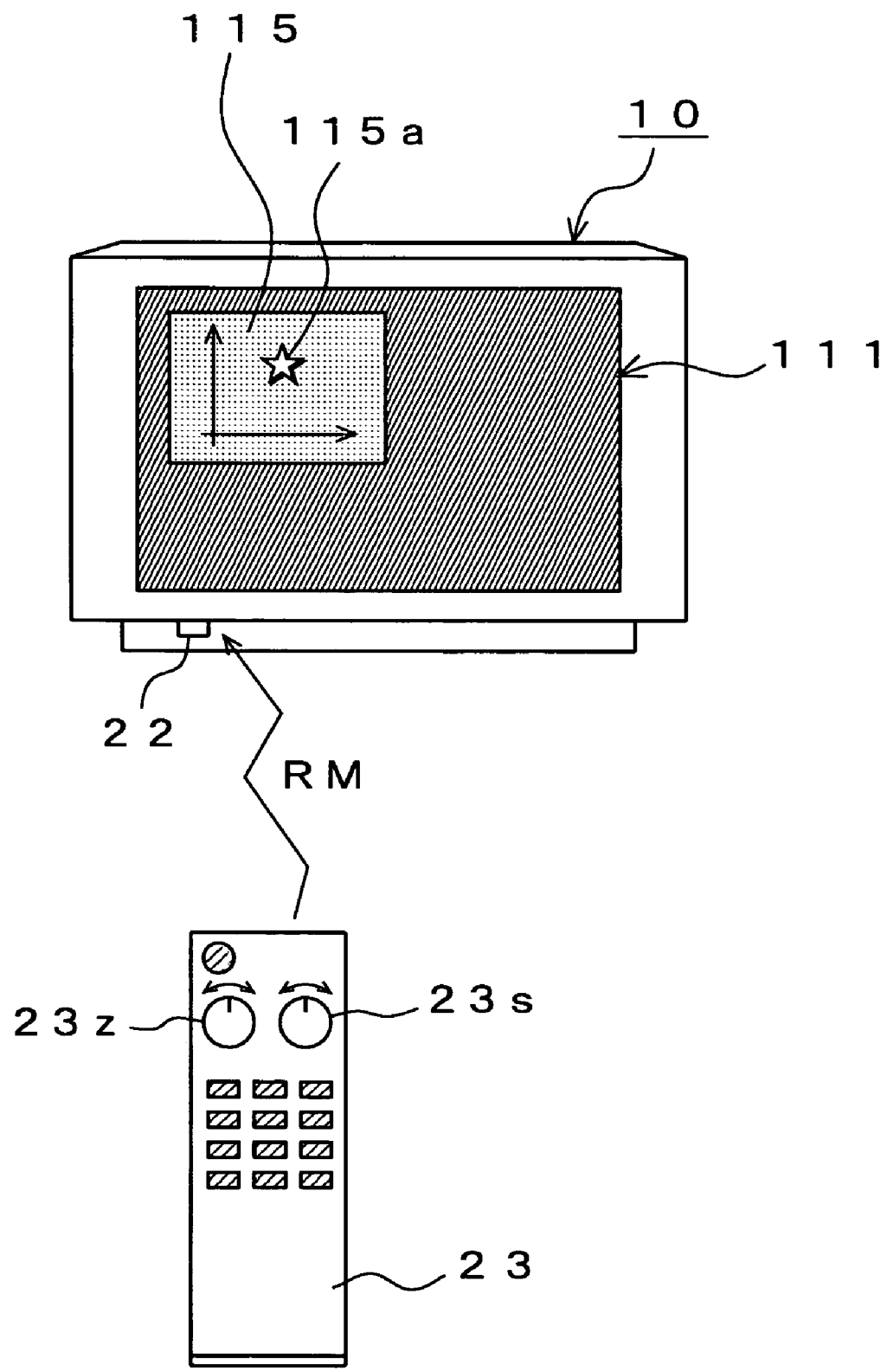
FIG. 3 is a diagram for showing an example of a user interface provided to adjust a picture quality.
Figure 4:
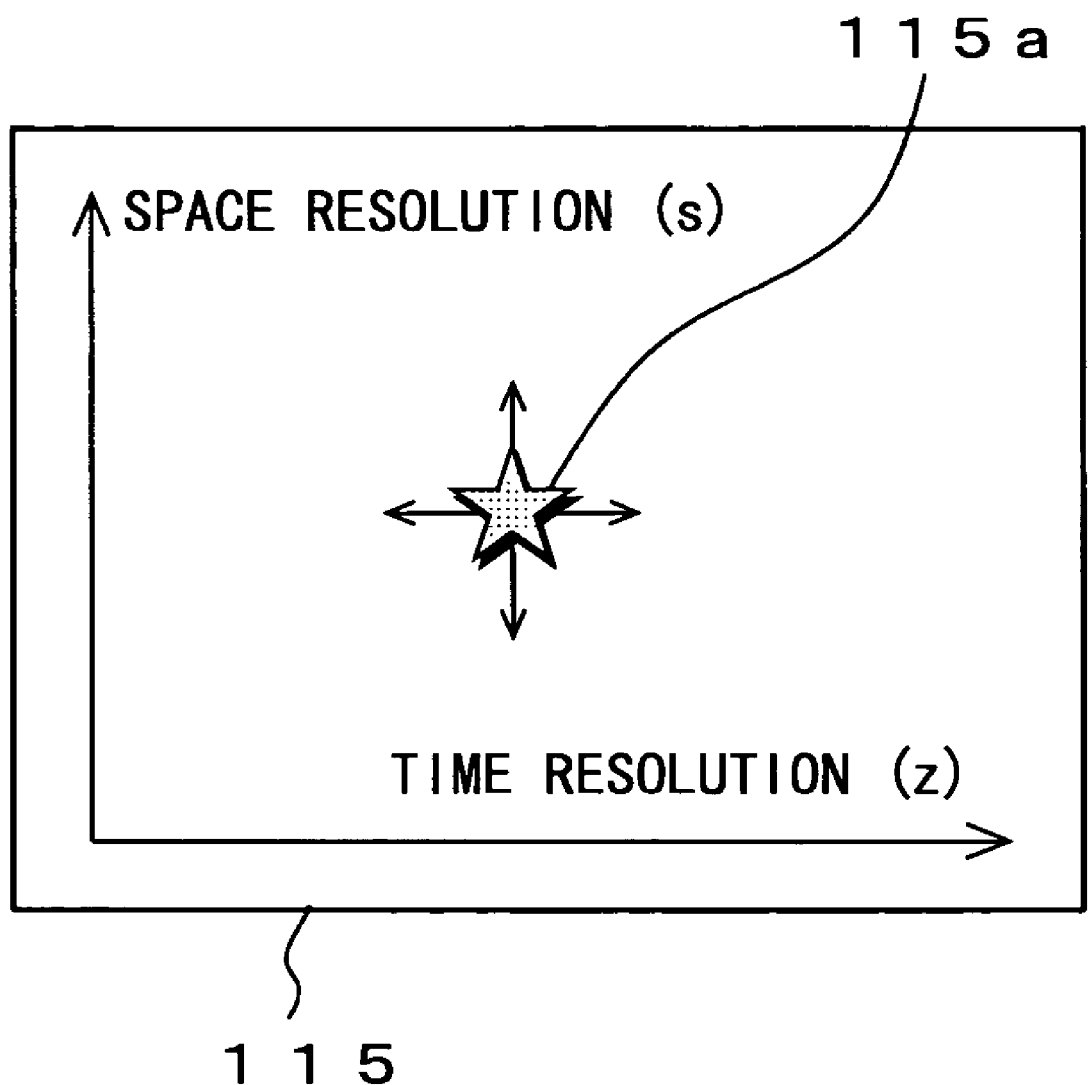
FIG. 4 is an expanded diagram for showing an adjustment screen.

FIG. 3 shows one example of a user interface for adjusting the adjustment values, s and z. In adjustment, at the display portion 24 (see FIG. 1), an adjustment screen 115 on which an adjustment position of the adjustment values, s and z is indicated by a ☆-marked icon 115a is displayed based on on-screen display (OSD). Further, the remote-control transmitter 23 is equipped with rotary type knobs 23z and 23s as user operation means. FIG. 4 shows the adjustment screen 115 as expanded.

The user can operate the knob 23z to move the icon 115a to the right and left on the adjustment screen 115, thereby adjusting the time-directional resolution adjustment value, z. Further, the user can operate the knob 23s to move the icon 115a up and down on the adjustment screen 115, thereby adjusting the space-directional resolution adjustment value, s. The user can adjust the adjustment values, s and z as referencing the adjustment screen 115 displayed at the display portion 24, thereby facilitating the adjustment.

It is to be noted that the remote-control transmitter 23 may be equipped with, in place of the rotary type knobs 23z and 23s, a see-saw type button, a push button, a pointing device such as a joystick, mouse, or a trackball, etc. Further, the adjustment values, s and z after being adjusted by the user may be displayed digitally on the adjustment screen 115.

Figure 5:
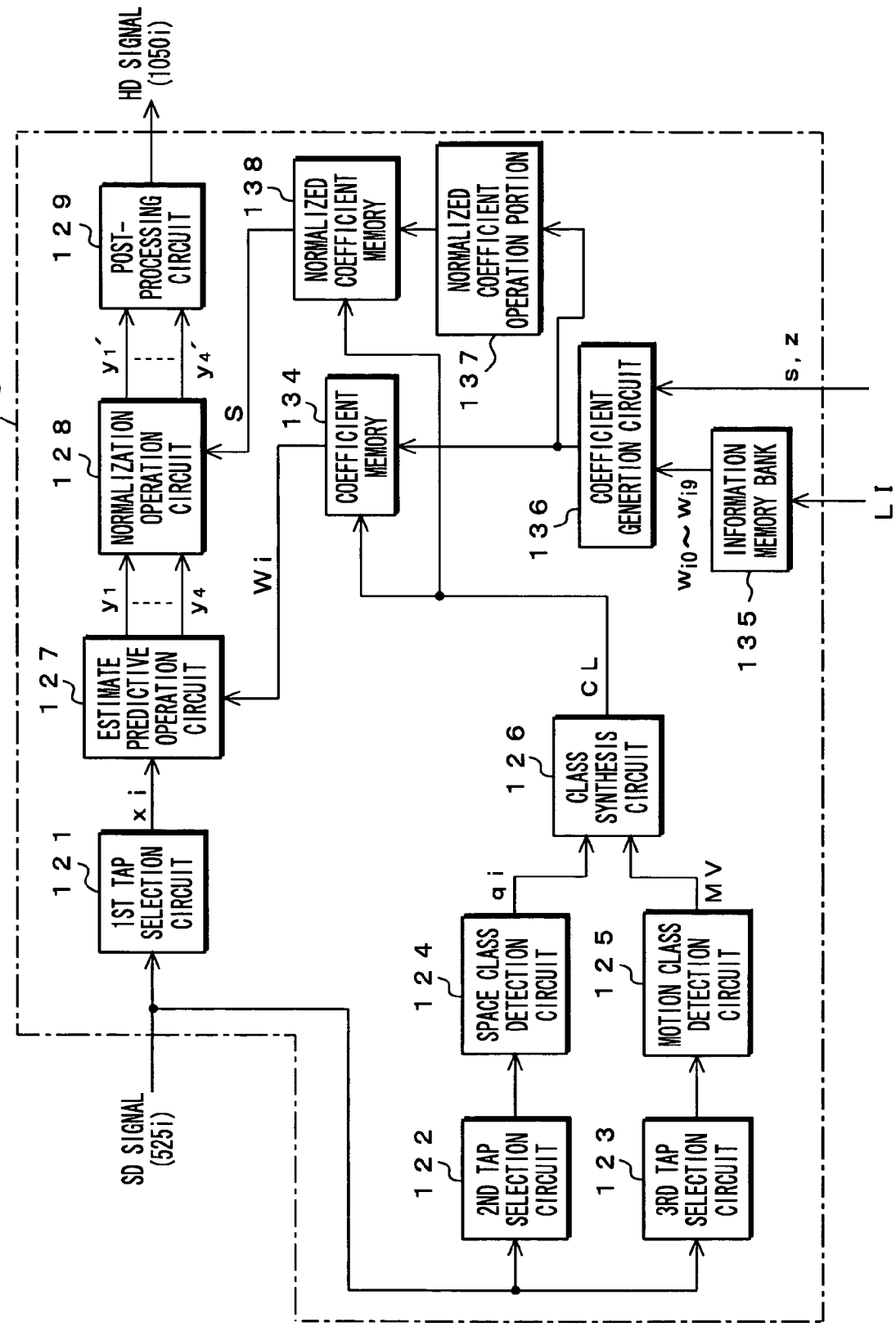
FIG. 5 is a block diagram for showing a configuration of a DRC circuit.

The following will describe the DRC circuit 18 in detail. FIG. 5 shows a configuration of the DRC circuit 18.

This DRC circuit 18 has first through third tap selection circuits 121-123 each for selectively taking out pieces of data for plural SD pixels positioned in a periphery of a target position in an HD signal (1050i signal) from an SD signal (525i signal) received via the internal bus 11 from the decoder 13 and outputting these pieces of data.

The first tap selection circuit 121 selectively takes out pieces of data for an SD pixel (referred to as "prediction tap") which is used in prediction. The second tap selection circuit 122 selectively takes out pieces of data for an SD pixel (referred to as "space class tap") which is used in classification of classes in accordance with a level distribution pattern of SD pixel data. The third tap selection circuit 123 selectively takes out pieces of data of an SD pixel (referred to as "motion class tap") of an SD pixel which is used in classification of classes in accordance with a motion. It is to be noted that when a space class is determined using SD pixel data that belongs to a plurality of fields, motion information is contained also in this space class.

Further, the DRC circuit 18 has a space class detection circuit 124 for detecting a level distribution pattern of pieces of data (SD pixel data) of a space class tap selectively taken out by the second tap selection circuit 122 and, based on this level distribution pattern, for detecting a space class and outputs its class information.

The space class detection circuit 124 performs operations to compress, for example, piece of SD pixel data from 8-bit data to 2-bit data. Then, compressed data that corresponds to each piece of SD pixel data is output from the space class detection circuit 124 as class information of a space class. In the present embodiment, data is compressed by adaptive dynamic range coding (ADRC). It is to be noted that as data compressing means, besides ADRC, differential PCM (DPCM), vector quantization (VQ), etc. may be used.

Although SDRC has fundamentally been developed for high-performance coding used in a video tape recorder (VTR), it is well applied to the above-mentioned data compression because it enables a local pattern of a signal level to be efficiently represented by using a small word length. When ADRC is used, assuming a maximum value of pieces of data (SD pixel data) of a space class tap to be MAX, its minimum value to be MIN, a dynamic range of the space class tap data to be DR (=MAX−MIN+1), and the number of re-quantization bits to be P, a re-quantization code qi is obtained as compressed data for each piece of SD pixel data, ki as the space class tap data by performing following Equation (1):

$$qi = [(ki - \text{MIN} + 0.5) * 2P/DR] \quad (1)$$

where contents within [ ] are to be truncated. If Na number of pieces of SD pixel data are present as the space class tap data, i=1 through Na.

Further, the DRC circuit 18 has a motion class detection circuit 125 for detecting a motion class which is mainly used to indicate a degree of a motion from pieces of data (SD pixel data) of a motion class tap selectively taken out by the third tap selection circuit 123 and outputting its class information.

This motion class detection circuit 125 calculates interframe differences from pieces of data (SD pixel data), mi and ni of a motion class tap selectively taken out by the third tap selection circuit 123 and, further, performs threshold value processing on an average value of absolute values of these differences, thereby detecting a motion class which is an index of a motion. That is, the motion class detection circuit 125 calculates an average value AV of absolute values of differences by using following Equation (2):

$$AV = \frac{\sum_{i=1}^{Nb} |mi - ni|}{Nb} \quad (2)$$

If, for example, 12 pieces of SD pixel data, m1-m6 and n1-m6 are taken out by the third tap selection circuit 123, Nb is 6 in Equation (2).

Then, the motion class detection circuit 125 compares the average value AV thus calculated to one or a plurality of threshold values, to obtain class information MV of the motion class. For example, in a case where three threshold values th1, th2, and th3 (th1<th2<th3) to detect four motion classes, if AV≦th1, MV=0; if th1<AV≦th2, MV=1; if th2<AV≦th3, MV=2; and if th3<AV, MV=3.

Further, the DRC circuit 18 has a class synthesis circuit 126. This class synthesis circuit 126 obtains a class code CL indicative of a class to which pixel data (HD pixel data to be created) of a target position in the HD signal belongs, based on a re-quantization code qi as class information of a space class which is output from the space class detection circuit 124 and class information MV which is output from the motion class detection circuit 125. This class synthesis circuit 126 calculates by operations a class code CL by using following Equation (3).

$$CL = \sum_{i=1}^{Na} qi(2^P)^{i-1} + MV \cdot (2^P)^{Na} \quad (3)$$

where Na indicates the number of pieces of data (SD pixel data) of a space class and P indicates the number of re-quantization bites in ADRC.

Further, the DRC circuit 18 has a coefficient memory 134. This coefficient memory 134 stores, for each class, plural pieces of coefficient data, Wi used in an estimate equation that is used by an estimate predictive operation circuit 127 described later. This coefficient data Wi is information which is used to convert an SD signal (525i signal) into an HD signal (1050i signal). The coefficient memory 134 is supplied with a class code CL output from the above-mentioned class synthesis circuit 126 as read address information. The coefficient memory 134 reads coefficient data, Wi (i=1-n) of the estimate equation that corresponds to the class code CL and supplies it to the estimate predictive operation circuit 127.

Further, the DRC circuit 18 has an information memory bank 135. The estimate predictive operation circuit 127 described later calculates, by operations, HD pixel data, y to be generated, using following estimate equation (4) based on the prediction tap data (SD pixel data) xi and the coefficient data Wi read from the coefficient memory 134:

$$y = \sum_{i=1}^{n} W_i \cdot x_i \quad (4)$$

where "n" indicates the number of prediction tapes selected by the first tap selection circuit 121.

It is to be noted that positions of n number of pieces of the pixel data of a prediction tap selectively taken out by the tap selection circuit 121 are diffused in space directions (horizontal and vertical directions) and a time direction with respect to the target position in the HD signal.

The coefficient data, Wi (i=1-n) in an estimate equation is generated by a generation equation which has the above-mentioned adjustment values, s and z as parameters as indicated in following Equation (5).

$$W_i = w_{i0} + w_{i1}s + w_{i2}z + w_{i3}s^2 + w_{i4}sz + w_{i5}z^2 + w_{i6}s^3 + \\ w_{i7}s^2z + w_{i8}sz^2 + w_{i9}z^3 \quad (5)$$

The information memory bank 135 stores, for each class, pieces of coefficient seed data, wi0-wi9 (i=1-n) which are coefficient data in this generation equation. A method for generating this coefficient seed data will be described later.

As described above, in a case where a 525i signal is converted into a 1050i signal, it is necessary to obtain four pixels of the 1050i signal for each pixel of the 525i signal in each of an odd-numbered field and an even-numbered field. In this case, the four pixels in a 2×2 unit pixel block that constitutes the 1050i signal in each of the odd-numbered and even-numbered fields have different phase lags with respect to a center prediction tap.

Figure 6:
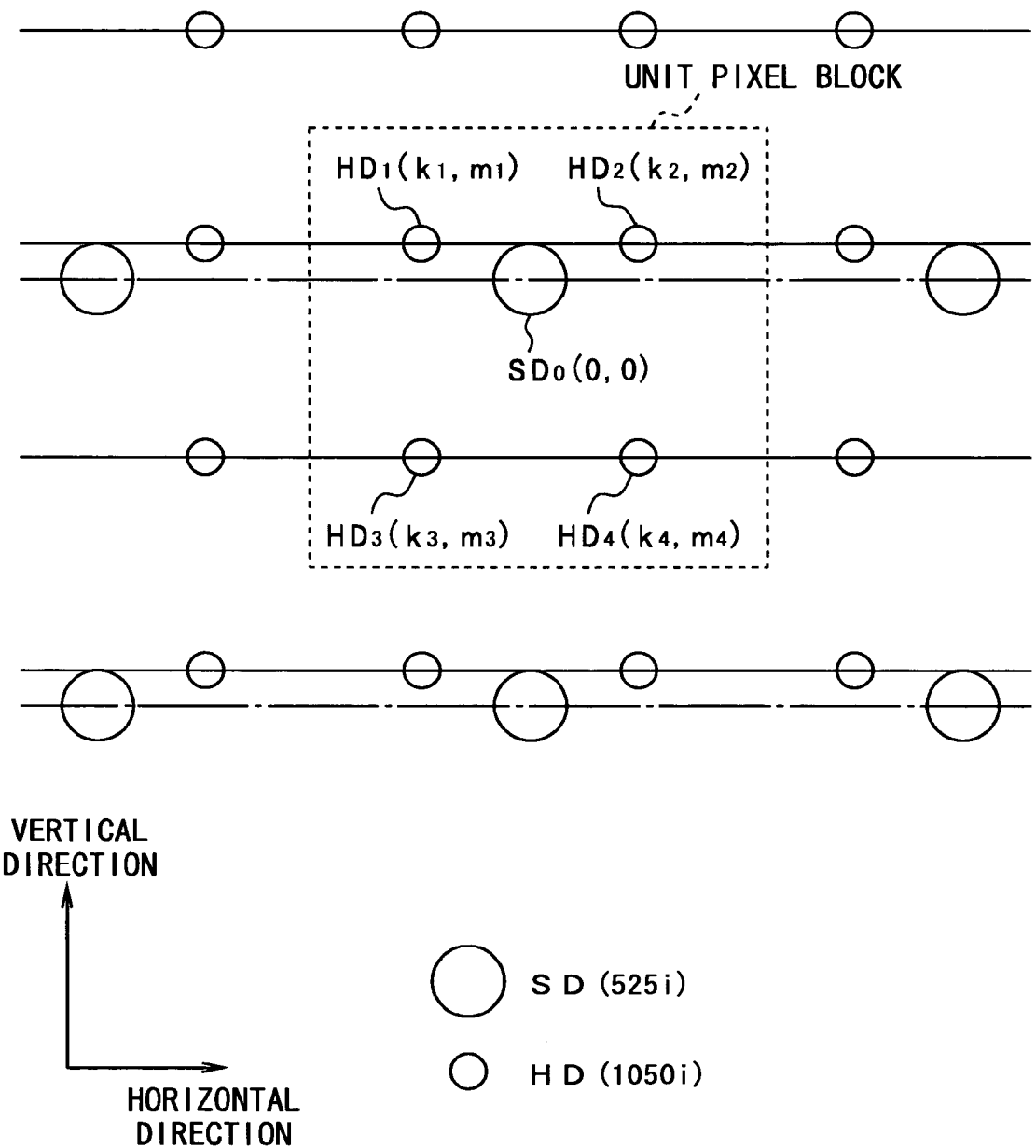
FIG. 6 is a diagram for showing a phase lag (in an odd-numbered field) from a center prediction tap of four pixels in a unit pixel block of an HD signal (1050i signal)

FIG. 6 shows phase lags from a center prediction tap SD0 of the four pixels HD1-HD4 in the 2×2 unit pixel block that constitutes the 1050i signal in the odd-numbered field. In the figure, positions of HD1-HD4 are shifted from a position of SD0 by k1-k4 horizontally and m1-m4 vertically, respectively.

FIG. 7 shows phase lags from a center prediction tap SD0' of four pixels HD1'-HD4' in a 2×2 unit pixel block that constitutes the 1050i signal in the even-numbered field. In the figure, positions of HD1'-HD4' are shifted from a position of SD0' by k1'-k4 horizontally and m1'-m4' vertically, respectively. Therefore, the above-mentioned information memory bank 135 stores pieces of coefficient seed data, wi0-wi9 (i=1-n) for each of combinations of the classes and the output pixels (HD1-HD4 and HD1'-HD4').

Further, the information memory bank 135 stores pieces of coefficient seed data, wi0-wi9 (i=1-n) that respectively correspond to a plurality of brightness ranges. Finally, this information memory bank 135 stores pieces of coefficient seed data, wi0-wi9 (i=1-n) for each of combinations of the brightness ranges, the classes, and the output pixels (HD1-HD4 and HD1'-HD4').

Further, the DRC circuit 18 has a coefficient generation circuit 136. This coefficient generation circuit 136 generates pieces of coefficient data Wi (i=1-n) for an estimate equation corresponding to adjustment values, s and z for each class by using Equation (5) based on the pieces of coefficient seed data, wi0-wi9 (i=1−n) of each class and the adjustment values, s and z. To this coefficient generation circuit 136, the above-mentioned pieces of coefficient seed data, wi0-wi9 (i=1−n) for each class corresponding to a brightness range which contains brightness indicated by the brightness information LI are loaded from the information memory bank 135.

The pieces of coefficient data, Wi (i=1−n) of each class generated by this coefficient generation circuit 136 are stored in the above-mentioned coefficient memory 134. The pieces of coefficient data, Wi (i=1−n) of each class are generated by this coefficient generation circuit 136 in, for example, each vertical blanking period. It is thus possible to, even if the adjustment values, s and z are changed by operations of the user's remote-control transmitter 23, immediately alter the pieces of coefficient data, Wi of each class stored in the coefficient memory 134 so that the pieces of data may correspond to these adjustment values, s and z, thus permitting the user to adjust a resolution smoothly.

Further, the DRC circuit 18 has a normalized coefficient operation portion 137 for calculating by operations a normalized coefficient S that corresponds to the pieces of coefficient data, Wi (i=1−n) obtained by the coefficient generation circuit 136 by using following Equation (6) and a normalized coefficient memory 138 for storing this normalized coefficient S:

$$S = \sum_{i=1}^{n} W_i \qquad (6)$$

The normalized coefficient memory 138 is supplied with, as read address information, a class code CL output from the above-mentioned class synthesis circuit 126. From the normalized coefficient memory 138, a normalized coefficient S that corresponds to the class code CL is read and supplied to a normalization operation circuit 128 described later.

Further, the DRC circuit 18 has the estimate predictive operation circuit 127 for calculating by operations pixel data (HD pixel data to be created) of a target position in the HD signal by using the estimate equation (4), based on data (SD pixel data) xi of a prediction tap selectively taken out by the first tap selection circuit 121 and the coefficient data Wi read from the coefficient memory 134.

As described above, to convert an SD signal (525i signal) into an HD signal (1050i signal), it is necessary to obtain four pixels (see HD1-HD4 in FIG. 6 and HD1'-HD4' in FIG. 7) of the HD signal for each pixel of the SD signal. This estimate predictive operation circuit 127 generates pixel data for each 2×2 unit pixel block that constitutes the HD signal.

That is, this estimate predictive operation circuit 127 is supplied with data, xi of a prediction tap that corresponds to four pixels (pixels of interest) in a unit pixel block from the first tap selection circuit 121 and the pieces of coefficient data, Wi corresponding to four pixels that constitute the unit pixel block from the coefficient memory 134. The pieces of data, y1-y4 of the four pixels that constitute the unit pixel block are each calculated by operations using the above-mentioned estimate equation (4).

Further, the DRC circuit 18 has the normalization operation circuit 128. This normalization operation circuit 128 normalizes pieces of data, y1-y4 of four pixels sequentially output from the estimate predictive operation circuit 127 by dividing them by the normalization coefficient S that corresponds to the pieces of coefficient data, Wi (i=1−n) read from the normalized coefficient memory 138 and used in the respective operations. Although the coefficient data, Wi in an estimate equation is obtained by the coefficient generation circuit 136 as described above, the coefficient data thus obtained contains a round-off error, so that it is not guaranteed that a total sum of the pieces of coefficient data, Wi (i=1−n) becomes 1.0. Therefore, pieces of data, y1-y4 of each pixel calculated by operations in the estimate predictive operation circuit 127 fluctuate in level owing to a round-off error. As described above, the fluctuations in level can be removed by performing normalization at the normalization operation circuit 128.

Further, the DRC circuit 18 has a post-processing circuit 129 for linear-sequencing pieces of data, y1'-y4' of four pixels in each of the unit pixel blocks sequentially supplied as normalized by the normalization operation circuit 128 and outputting them in a format of the 1050i signal.

The following will describe operations of the DRC circuit 18.

From an SD signal (525i signal) transmitted from the decoder 13 (see FIG. 1) via the internal bus 11, the second tap selection circuit 122 selectively takes out data (SD pixel data) of a space class tap positioned in a periphery of four pixels (pixels of a target position) in a unit pixel block that constitutes an HD signal (1050i signal) to be created. The data (SD pixel data) of the space class tap selectively taken out by this second tap selection circuit 122 is supplied to the space class detection circuit 124. This space class detection circuit 124 performs ADRC processing on each piece of the SD pixel data given as the space class tap data, to obtain a re-quantization code, qi as class information of a space class (class classification mainly for representation of a waveform in a space) (see Equation (1)).

Further, from the above-mentioned SD signal (525i signal), the third tap selection circuit 123 selectively takes out data (SD pixel data) of a motion class tap positioned in a periphery of four pixels (pixels of a target position) in a unit pixel block that constitutes an HD signal (1050i signal) to be created. The data (SD pixel data) of the motion class tap selectively taken out by this third tap selection circuit 123 is supplied to the motion class detection circuit 125. This motion class detection circuit 125 obtains class information MV of a motion class (class classification mainly for representation of a degree of a motion) from each piece of the SD pixel data given as motion class tap data.

This motion information MV and the above-mentioned re-quantization code qi are supplied to the class synthesis circuit 126. From these motion information MV and re-quantization code qi, this class synthesis circuit 126 obtains a class code CL indicating a class to which four pixels (target pixels) in each unit pixel block belong, for each of the unit pixel blocks constituting an HD signal (1050i signal) to be created (see Equation (3)). This class code CL is supplied as read address information to the coefficient memory 134 and the normalized coefficient memory 138.

The coefficient memory 134 stores pieces of coefficient data, Wi (i=1−n) in an estimate equation obtained by using the pieces of coefficient seed data, wi0-wi9 (i=1−n) for each of the combinations of classes and output pixels (HD1-HD4 and HD1'-HD4') corresponding to adjustment values, s and z which are adjusted at the coefficient generation circuit 136 by the user in, for example, each vertical blanking period (see Equation (5)).

In this case, pieces of coefficient seed data, wi0-wi9 (i=1−n) which correspond to a brightness range in which brightness indicated by brightness information LI is contained are loaded from the information memory bank 135 to the coefficient generation circuit 136 on the basis of the brightness information LI in user's surroundings. Therefore, the coefficient generation circuit 136 generates pieces of coefficient data, Wi (i=1–n) that correspond to the brightness in the user's surroundings.

Further, the normalized coefficient memory 138 stores a normalized coefficient S, which is generated by the normalized coefficient operation portion 137, in such a manner that it may correspond to pieces of coefficient data Wi (i=1–n) in an estimate equation obtained by the coefficient generation circuit 136 as described above (see Equation (6)).

When a class code CL is supplied as read address information to the coefficient memory 134 as described above, pieces of coefficient data, Wi (i=1–n) in the estimate equation for four output pixels (HD1-HD4 in an odd-numbered field and HD1'-HD4' in an even-numbered field) corresponding to the class code CL are thus read from this coefficient memory 134 and supplied to the estimate predictive operation circuit 127. Further, the first tap selection circuit 121 selectively takes out, from the above-mentioned SD signal (525i signal), data (SD pixel data) of a prediction tap positioned in a periphery of four pixels (pixels of a target position) in a unit pixel block that constitutes an HD signal (1050i signal) to be created.

The estimate predictive operation circuit 127 calculates, by operations, pieces of data, y1-y4 of the four pixels (pixels of the target position) in the unit pixel block that constitutes the HD signal to be created, from data (SD pixel data) xi of the prediction tap and the piece of coefficient data, Wi (i=1–n) for the four output pixels read from the coefficient memory 134 (see Equation (4)). Then, the pieces of data, y1-y4 of the four pixels in the unit pixel block that constitutes the HS signal sequentially output from this estimate predictive operation circuit 127 are supplied to the normalization operation circuit 128.

As described above, the normalized coefficient memory 138 is supplied with the class code CL as address information. From the normalized coefficient memory 138, a normalized coefficient S that corresponds to the class code CL, that is, a normalized coefficient S that corresponds to coefficient data, Wi used in operations of the pieces of HD pixel data, y1-y4 output from the estimate predictive operation circuit 127 is read and supplied to the normalization operation circuit 128. This normalization operation circuit 128 normalizes pieces of the HD pixel data, y1-y4 output from the estimate predictive operation circuit 127 by dividing them by normalized coefficients S to which the pieces of data, y1-y4 correspond respectively. Thus, fluctuations in level of the pieces of data, y1-y4 owing to a round-off error, which has occurred when the coefficient data Wi is obtained by the coefficient generation circuit 136, are removed.

The pieces of data, y1'-y4' of the four pixels in the unit pixel block, which are thus normalized by the normalization operation circuit 128 and sequentially output therefrom, are supplied to the post-processing circuit 129. This post-processing circuit 129 linear-sequences the pieces of data, y1'-y4' of the four pixels in the unit pixel block sequentially supplied from the normalization operation circuit 128 and outputs them in a format of the 1050i signal. That is, the 1050i signal as the HD signal is output from the post-processing circuit 129.

In such a manner, in the DRC circuit 18, pieces of coefficient data Wi (i=1–n) in an estimate equation corresponding to adjustment values, s and z are used to calculate HD pixel data, y by operations. Therefore, the user can adjust the adjustment values, s and z, thereby arbitrarily adjusting space-directional and time-directional resolutions of an image due to the HD signal. Further, coefficient data of each class corresponding to the adjustment values, s and z can be generated and used by the coefficient generation circuit 136 on a case-by-case basis, to eliminate necessity of a memory for storing a lot of coefficient data, thereby saving on memory capacity.

Figure 8:
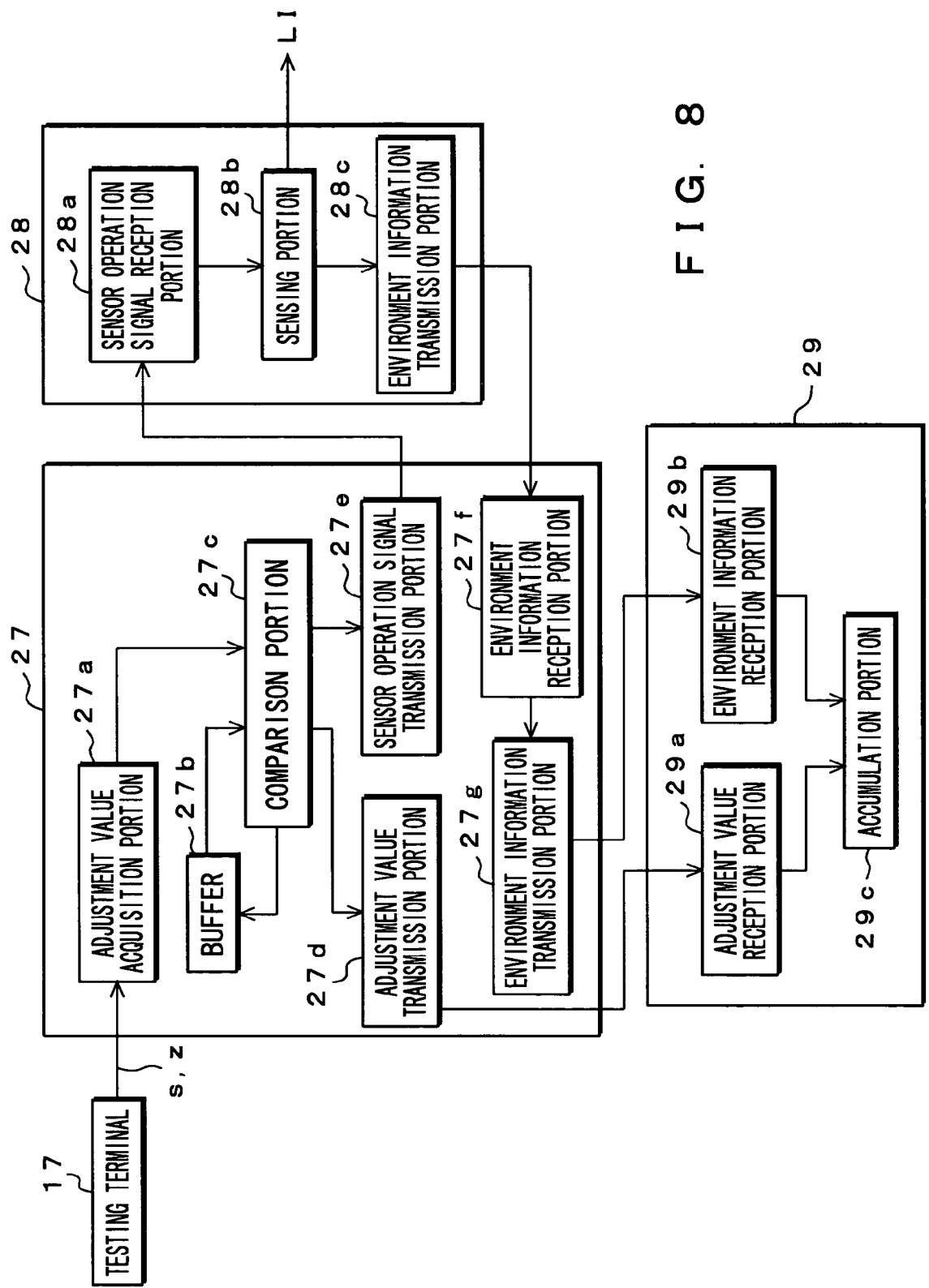
FIG. 8 is a block diagram for showing a configuration of an acquisition device, a sensor, and an accumulation device.

The following will describe the acquisition device 27, the sensor 28, and the accumulation device 29 in detail. FIG. 8 shows a configuration of the acquisition device 27, the sensor 28, and the accumulation device 29.

First, the acquisition device 27 will be described. The acquisition device 27 comprises an adjustment value acquisition portion 27a, a buffer 27b, a comparison portion 27c, an adjustment value transmission portion 27d, a sensor operation signal transmission portion 27e, an environment information reception portion 27f, and an environment information transmission portion 27g.

The adjustment value acquisition portion 27a periodically acquires each of the adjustment values, s and z uninterruptedly output from the testing terminal 17 (see FIG. 1). The buffer 27b holds adjustment values, s and z to be compared to the adjustment values, s and z acquired by the adjustment value acquisition portion 27a. The comparison portion 27c compares the current adjustment value, s acquired by the adjustment value acquisition portion 27a and the adjustment value, s held in the buffer 27b to each other and, if they do not agree, sends the current adjustment value, s to the adjustment value transmission portion 27d. Similarly, the comparison portion 27c compares the current adjustment value, z acquired by the adjustment value acquisition portion 27a and the adjustment value, z held in the buffer 27b to each other and, if they do not agree, sends the current adjustment value, z to the adjustment value transmission portion 27d.

The adjustment value transmission portion 27d transmits the adjustment values, s and z sent from the comparison portion 27c to the accumulation device 29. It is to be noted that the adjustment values, s and z acquired by the adjustment value acquisition portion 27a each have time information added thereto. Therefore, the adjustment values, s and z, which are sent from the comparison portion 27c to the adjustment value transmission portion 27d and transmitted to the accumulation portion 29, also have the time information added thereto. It is thus possible for the accumulation device 29 to reproduce a process of changes in adjustment value through a series of adjustments even if the adjustment values, s and z are intermittently transmitted to the accumulation device 29 from the acquisition device 27. It is to be noted that when adjustment values, s and z are sent from the comparison portion 27c to the adjustment value transmission portion 27d, these adjustment values, s and z are sent also to the buffer 27b, to update adjustment values, s and z held in this buffer 27b.

When the adjustment values, s and z are sent from the comparison portion 27c to the adjustment value transmission portion 27d, the sensor operation signal transmission portion 27e transmits a sensor operation signal to the sensor 28. The environment information reception portion 27f receives environment information transmitted from the sensor 28. The environment information transmission portion 27g transmits the environment information received by the environment information reception portion 27f, to the accumulation device 29.

Figure 9:
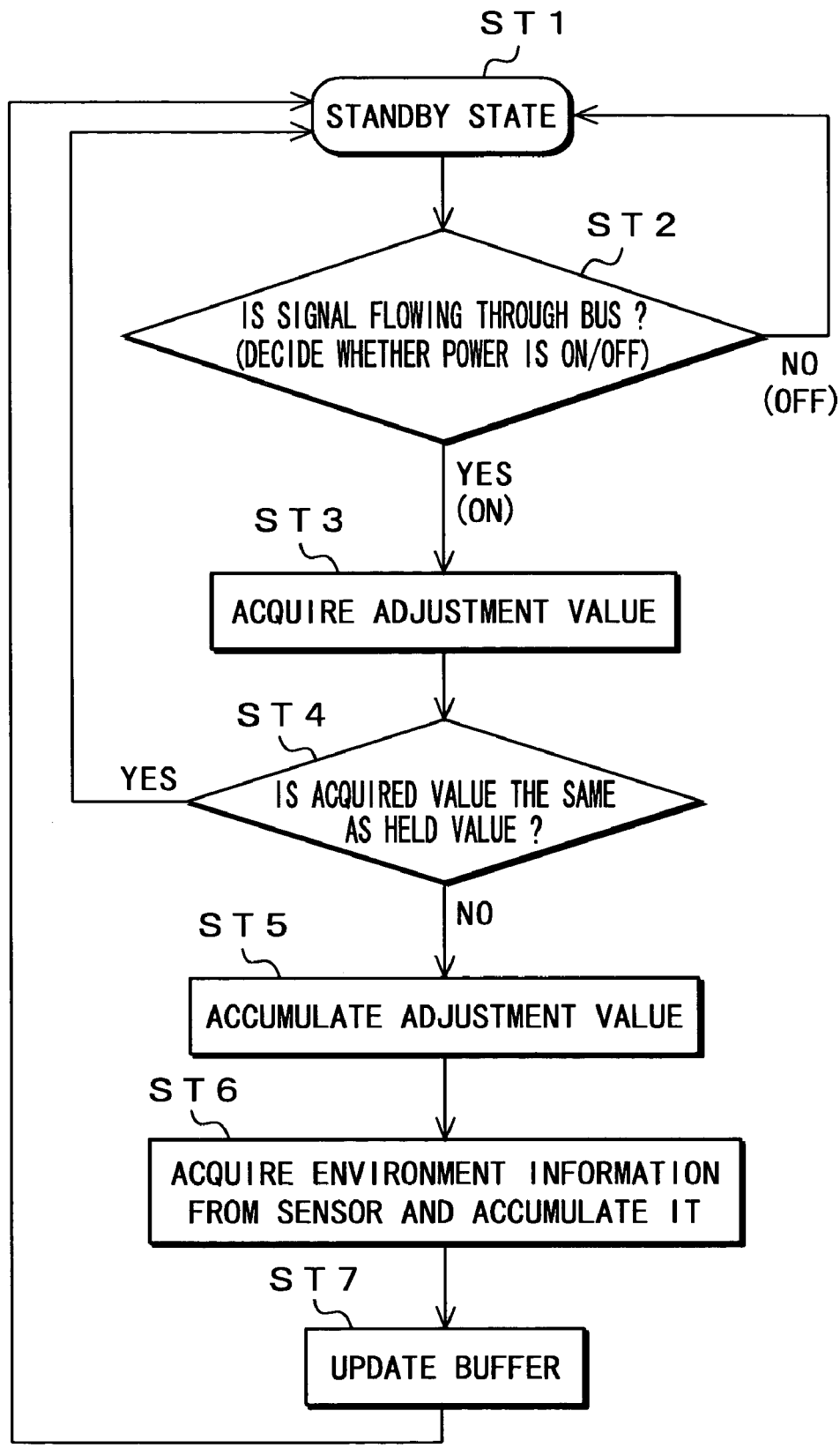
FIG. 9 is an explanatory flowchart of operations of the acquisition device (side of TV body)

The following will describe operations of the acquisition device 27 with reference to a flowchart of FIG. 9.

The process, if in a standby state at step ST1, goes to step ST2 periodically. At step ST2, the process decides whether the adjustment values, s and z are output to the internal bus 11, that is, whether power is ON. If the power is OFF, the process returns to the standby state of step ST1. If the power is ON, on the other hand, the process goes to step ST3. At step ST3, the adjustment value acquisition portion 27a acquires the adjustment values, s and z output from the testing terminal 17. In this case, to the acquired adjustment values, s and z, time information is added.

Next, at step ST4, the comparison portion 27*c* compares the adjustment values, s and z (acquired values) acquired by the adjustment value acquisition portion 27*a* to the adjustment values, s and z (held values) held in the buffer 27*b* to decide whether they agree respectively. If such is the case, the process returns to the standby state of step ST1. Otherwise, the process goes to step ST5.

At step ST5, if disagreement of the adjustment values s or that of the adjustment values z is decided, the comparison portion 27*c* transmits the adjustment value, s or z acquired by the adjustment value acquisition portion 27*a* from the adjustment value transmission portion 27*d* to the accumulation device 29 to accumulate it in it, respectively. It is to be noted that the adjustment values, s and z are adjusted individually (see FIG. 3), so that at step ST4, not both of the adjustment values, s and z are decided to disagree.

Next, at step ST6, the sensor operation signal transmission portion 27*e* transmits the sensor operation signal to the sensor 28, the environment information reception portion 27*f* receives environment information transmitted from the sensor, and the environment information transmission portion 27*g* transmits that environment information to the accumulation device 29 to accumulate it in it. At step ST7, the process updates contents held in the buffer 27*b* and then returns to the standby state of step ST1. In this case, if the adjustment value, s or z is decided to disagree, the process sends the adjustment value, s or z acquired by the adjustment value acquisition portion 27*a* from the comparison portion 27*c* to the buffer 27*b* to update it, respectively.

Figure 10:
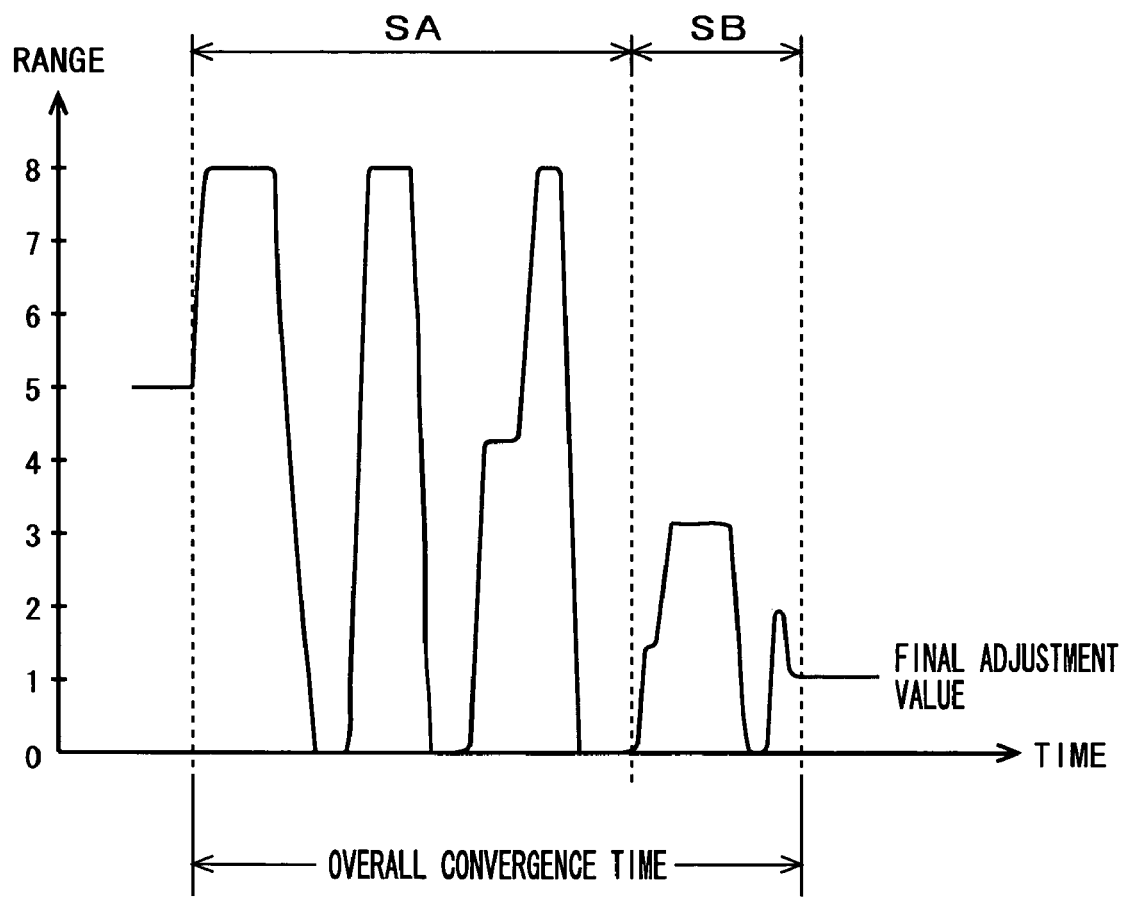
FIG. 10 is a graph diagram for showing an example of changes in adjustment value through a series of adjustments.

When the user adjusts the adjustment values, s and z, an adjustment value, s output uninterruptedly from the testing terminal 17 changes. The above-mentioned acquisition device 27 can acquire final adjustment values through a series of adjustments of these adjustment values, s and z and adjustment values in a process of changes up to the final adjustment values and transmit them to the accumulation device 29. FIG. 10 shows an example of changes in adjustment value through a series of adjustments. In this example, the user can adjust the adjustment values in ranges 0-8. It is to be noted that a time that corresponds to a process in changes of adjustment value in this series of adjustment pieces is referred to as an "overall convergence time". Further, if an adjustment value has changed and remained as it is for a predetermined lapse of time, it can be decided that a series of adjustments have been completed to reach a final adjustment value.

Next, the sensor 28 will be described. This sensor 28 comprises a sensor operation signal reception portion 28*a*, a sensing portion 28*b*, and an environment information transmission portion 28*c*. The sensor operation signal reception portion 28*a* receives the sensor operation signal sent from the acquisition device 27.

The sensing portion 28*b* has a variety of sensors for acquiring environment information in user's surroundings such as, brightness, noise, an audio-visual distance, an audio-visual direction, a temperature, a humidity, a time, and a radio wave condition. The various sensors of this sensing portion 28*b* each enter a sensing state to acquire information when the sensor operation signal is received by the above-mentioned sensor operation signal reception portion 28*a*. However, the sensor which acquires brightness information LI enters the sensing state periodically to acquire the brightness information LI because this brightness information LI is used at the DRC circuit 18 (see FIG. 1) as described above.

The environment information transmission portion 28*c* transmits environment information acquired by the various sensors of the above-mentioned sensing portion 28*b* to the acquisition device 27.

Figure 11:
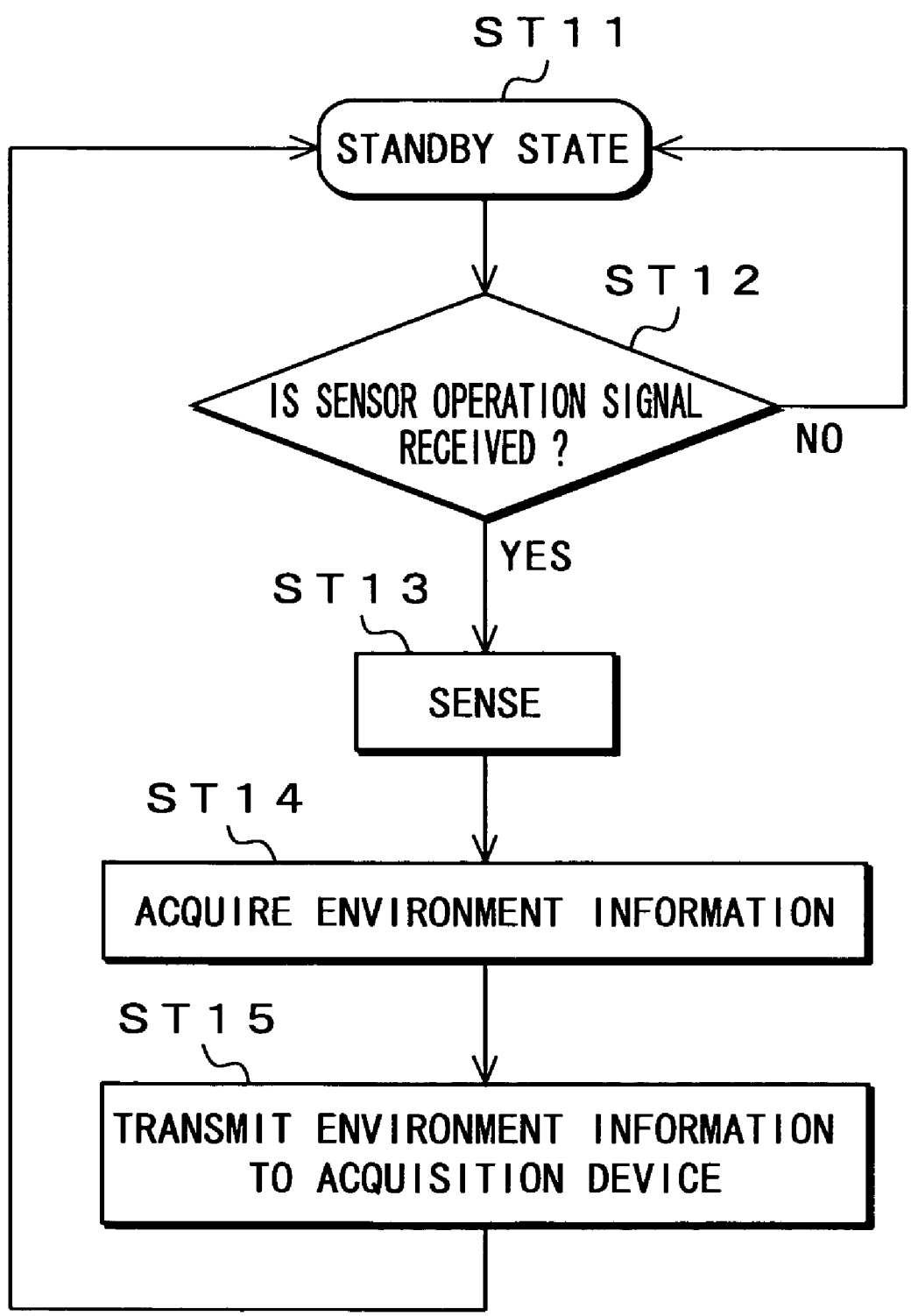
FIG. 11 is an explanatory flowchart of operations of the sensor.

The following will describe operations of the sensor 28 with reference to a flowchart of FIG. 11.

The process, if in the standby state at step ST11, goes to step ST2 periodically. At step ST2, the process decides whether the sensor operation signal reception portion 28*a* receives the sensor operation signal. If it receives no sensor operation signal, the process returns to the standby state of step ST11. If it receives the sensor operation signal, the process goes to step ST13.

At step ST13, the various sensors of the sensing portion 28*b* enter the sensing state, to acquire environment information at step ST14. At step ST15, the environment information transmission portion 28*c* transmits to the acquisition device 27 the environment information acquired by the sensors of the sensing portion 28*b*, then the process returns to the standby state of step ST11.

In such a manner, when the sensor operation signal is transmitted from the acquisition device 27, the sensor 28 acquires environment information in the user's surroundings using the sensors of the sensing portion 28*b* and transmits the environment information to the acquisition device 27. It is to be noted that brightness information LI is acquired periodically irrespective of whether the sensing operation signal from the acquisition device 27 is transmitted.

Next, the accumulation device 29 will be described. This accumulation device 29 comprises an adjustment value reception portion 29*a*, an environment information reception portion 29*b*, and an accumulation portion 29*c*. The adjustment value reception portion 29*a* receives adjustment values, s and z sent from the acquisition device 27. Further, the environment information reception portion 29*b* receives environment information sent from the acquisition device 27.

Further, the accumulation portion 29*c* stores a final adjustment value in each series of adjustments on adjustment values, s and z and history information related to a process of changes in adjustment value up to the final adjustment value based on the adjustment values, s and z received by the adjustment value reception portion 29*a*, that is, a final adjustment value through a series of adjustments on the adjustment values, s and z and an adjustment value in a process of changes up to this final adjustment value.

In this case, as the history information, either an adjustment value in a process of changes up to the final adjustment value may be stores as it is or processed information obtained from it may be stored. In the present embodiment, for example, the processed information is stored. For example, the processed information may be information of the above-mentioned overall convergence time shown in FIG. 10 as well as information on a shape of a waveform that corresponds to the process of changes in adjustment value etc.

For example, the information on waveform shape can be obtained by dividing a process of changes in adjustment value into a first region SA that corresponds to a period when the user has confirmed a change in picture quality of an image displayed on the screen of the display portion 24 and a second region SB that corresponds to a period when the user has made adjustments so that the subsequent picture quality may be a predetermined quality and sorting waveform shapes in each of the regions into a plurality of types.

It is to be noted that the waveform shapes in the first region SA can be sorted into plural types based on the number of waves contained in this region. In this case, a type having an increasing number of waves is considered to have been difficult for the user to know a change in picture quality based on a change in adjustment value and so is decided to have lower reliability of the final adjustment value.

The waveform shapes in the second region SB, on the other hand, can be sorted into plural types in terms of how to attenuate amplitude. In this case, a type having a steeper attenuation is considered to be such that the user has determined a final adjustment value without checking detailed changes in picture quality of the image and so is decided to have lower reliability of the final adjustment value.

The process of changes in adjustment value may be divided into the two regions SA and SB as mentioned above by the following first through fourth methods.

By the first method, the overall convergence time is divided at a predetermined percentage to divide the process of changes in adjustment value into the two regions SA and SB. For example, an 80% of the overall convergence time is set as the first region SA and the remaining 20% of it is set as the second region SB. In this case, the predetermined percentage is set beforehand.

By the second method, the number of waves of an adjustment value contained in a process of changes in adjustment value, that is, in the overall convergence time is set as the number of all the waves, which is divided at a predetermined percentage to divide the process of changes in adjustment value into the two regions SA and SB. For example, an 80% of all of the waves are set to the first region SA and the remaining 20% of them are set to the second region SB. In this case, the predetermined percentage is set beforehand.

By the third method, a first half region containing the waves of an adjustment value having at least a predetermined amplitude value is set as the first region SA and a second half region containing only the waves of an adjustment value having an amplitude less than this predetermined value is set as the second region SB. In this case, the predetermined value is set beforehand.

The fourth method is employed in a case where, for example, the remote-control transmitter 23 is equipped with operating means such as a button which is operated at a timing to start such adjustment as to provide a predetermined picture quality of an image after the user has confirmed a change in picture quality of the image, whereby based on an output signal of that operation means, a process of changes in adjustment value is divided into the two regions SA and AB.

In the present embodiment, for example, the third method is employed. The above-mentioned two regions SA and SB shown in FIG. 10 are obtained by dividing a process of changes in adjustment value by the above-mentioned third method.

FIGS. 12 and 13 show examples of changes in adjustment value through a series of adjustments. The two regions SA and SB in these figures are also obtained by dividing the process of changes in adjustment value by the above-mentioned third method. In these examples also, the user can adjust the adjustment values in ranges 0 -8.

The examples of changes shown in FIGS. 12 and 13 have different numbers of the waves of an adjustment value contained in the first region SA. Therefore, in these examples of changes shown in FIGS. 12 and 13, the waveform shape of the first region SA is sorted into another type.

In this case, in the example of changes shown in FIG. 12, the number of waves contained in the first region SA is "1", so that it is considered that the user has easily confirmed changes in picture quality due to changes in adjustment value; therefore, reliability of the final adjustment value is decided to be high. That is, a type (history information) obtained by sorting the waveform shape in the first region SA of the example of changes shown in FIG. 12 indicates that the final adjustment value has high reliability.

In the example of changes shown in FIG. 13, on the other hand, the number of waves contained in the first region SA is "4", so that it is considered that the user has found it difficult to confirm changes in picture quality due to changes in adjustment value; therefore, reliability of the final adjustment value is decided to be low. That is, a type (history information) obtained by sorting the waveform shape in the first region SA of the example of changes shown in FIG. 13 indicates that the final adjustment value has low reliability.

Further, the examples of changes shown in FIGS. 12 and 13 have different manners in which an amplitude of an adjustment value in the second region SB attenuates. Therefore, in the examples of changes shown in FIGS. 12 and 13, the waveform shape of the second region SB is sorted into another type.

In this case, in the example of changes shown in FIG. 12, the amplitude of an adjustment value in the second region SB attenuates mildly, so that it is considered that the user has determined a final adjustment value as watching detailed changes in picture quality of an image; therefore, the reliability of the final adjustment value is decided to be high. That is, a type (history information) obtained by sorting the waveform shape in the second region SB of the example of changes shown in FIG. 12 indicates that the final adjustment value has high reliability.

In the example of changes shown in FIG. 13, on the other hand, the amplitude of an adjustment value in the second region SB attenuates steeply, so that it is considered that the user has determined a final adjustment value without watching detailed changes in picture quality of an image; therefore, the reliability of the final adjustment value is decided to be low. That is, a type (history information) obtained by sorting the waveform shape in the second region SB of the example of changes shown in FIG. 13 indicates that the final adjustment value has low reliability.

Further, as described above, the accumulation portion 29c stores a final adjustment value through a series of adjustments and history information in a condition where the environment information acquired by the sensor 28 when the series of adjustments have been made and received by the environment information reception portion 29b is added to them. By thus adding the environment information to the final adjustment value through a series of adjustments and the history information, it is possible to know in which environment a final adjustment value through the series of adjustment pieces and history information have been adjusted and obtained. It is thus possible to divide and use, for each environment, the final adjustment value through each series of adjustments and history information, which are stored in the accumulation portion 29c.

FIG. 14 outlines an acquisition information table formed in the accumulation device 29c. Pieces of data 1, 2, . . . each indicate a final adjustment value through each series of adjustments, history information, and environment information. In the present embodiment, this acquisition information table is generated for each of the adjustment values, s and z.

The following will describe one example of a method for generating coefficient seed data. In this example, pieces of coefficient seed data, $wi0$-$wi9$ ($i=1$-$n$) are obtained which are coefficient data in the above-mentioned generation equation of Equation (5).

To facilitate the following explanation, $tj$ ($j=0$-$9$) is defined as indicated in following Equation (7):

$t0=1, t1=s, t2=z, t3=s2, t4=sz, t5=z2, t6=s3, t7=s2z,$
$t8=sz2, t9=z3$ (7)

By using this Equation (7), Equation (5) is transformed into Equation (8) as follows:

$$W_i = \sum_{j=0}^{9} wij tj \quad (8)$$

Finally, an undetermined coefficient, wij is obtained by learning. That is, for each combination of a class and an output pixel, plural pieces of SD pixel data and pieces of HD pixel data are used to determine a coefficient value that minimizes a squared error. It is a solution by means of a so-called least-squares method. Assuming the number of learning to be m, residual in a k'th ($1 \leq k \leq m$) learning data to be ek, and a total sum of squared errors to be E, E is given by following Equation (9) by using Equations (4) and (5):

$$E = \sum_{k=1}^{m} ek^2 \quad (9)$$

$$= \sum_{k=1}^{m} [y_k - (W_1 x_{1k} + W_2 x_{2k} + \cdots + W_n x_{nk})]2$$

$$= \sum_{k=1}^{m} \{y_k - [(t_0 w_{10} + t_1 w_{11} + \cdots + t_9 w_{19})x_{1k} + \cdots + (t_0 w_{no} +$$

$$t_1 w_{n1} + \cdots + t_9 w_{n9})x_{nk}]\}^2$$

$$= \sum_{k=1}^{m} \{y_k - [(w_{10} + w_{11}s + \cdots + w_{19}z^3)x_{1k} + \cdots + (w_{no} +$$

$$w_{n1}s + \cdots + w_{n9}z^3)x_{nk}]\}^2$$

where xik indicates k'th pixel data at an i'th prediction tap position in an SD image and yk indicates pixel data in the corresponding k'th HD signal.

By the solution by means of the least-squares method, wij in Equation (9) is obtained in such a manner that a partial differentiation value due to wij may be 0. This is indicated in Equation (10) as follows:

$$\frac{\partial E}{\partial wij} = \sum_{k=1}^{m} 2\left(\frac{\partial ek}{\partial wij}\right) e_k = -\sum_{k=1}^{m} 2 t_j x_{ik} e_k = 0 \quad (10)$$

By defining Xipjq and Yip as indicated in following Equations (11) and (12), Equation (10) is rewritten using a matrix as in following Equation (13).

$$X_{ipjq} = \sum_{k=1}^{m} x_{ik} t_p x_{jk} t_q \quad (11)$$

$$Y_{ip} = \sum_{k=1}^{m} x_{ik} t_p y_k \quad (12)$$

$$\begin{bmatrix} X_{1010} & X_{1011} & X_{1012} & \cdots & X_{1019} & X_{1020} & \cdots & X_{10n9} \\ X_{1110} & X_{1111} & X_{1112} & \cdots & X_{1119} & X_{1120} & \cdots & X_{11n9} \\ X_{1210} & X_{1211} & X_{1212} & \cdots & X_{1219} & X_{1220} & \cdots & X_{12n9} \\ \vdots & \vdots & \vdots & \ddots & \vdots & \vdots & \ddots & \vdots \\ X_{1910} & X_{1911} & X_{1912} & \cdots & X_{1919} & X_{1920} & \cdots & X_{19n9} \\ X_{2010} & X_{2011} & X_{2012} & \cdots & X_{2019} & X_{2020} & \cdots & X_{20n9} \\ \vdots & \vdots & \vdots & \ddots & \vdots & \vdots & \ddots & \vdots \\ X_{n910} & X_{n911} & X_{n912} & \cdots & X_{n919} & X_{n920} & \cdots & X_{n9n9} \end{bmatrix} \begin{bmatrix} w_{10} \\ w_{11} \\ w_{12} \\ \vdots \\ w_{19} \\ w_{20} \\ \vdots \\ w_{n9} \end{bmatrix} = \quad (13)$$

$$\begin{bmatrix} Y_{10} \\ Y_{11} \\ Y_{12} \\ \vdots \\ Y_{19} \\ Y_{20} \\ \vdots \\ Y_{n9} \end{bmatrix}$$

This equation is generally referred to as a normal equation. This normal equation is solved in terms of wij by using a discharge method (Gauss-Jordan elimination method), to calculate pieces of coefficient seed data, wi0–wi9 (i=1–n).

FIG. 15 shows a concept of one example of a method for generating the above-mentioned coefficient seed data. A plurality of SD signals is generated from an HD signal. For example, adjustment values, s and z for varying space-directional (vertical and horizontal) bands and a time-directional (frame-directional) band of a filter used to generate an SD signal from an HD signal are each varied in nine steps, to generate a total of 81 kinds of SD signals. Then, learning is performed between this plurality of kinds of SD signals and the HD signal to obtain coefficient seed data.

Figure 16:
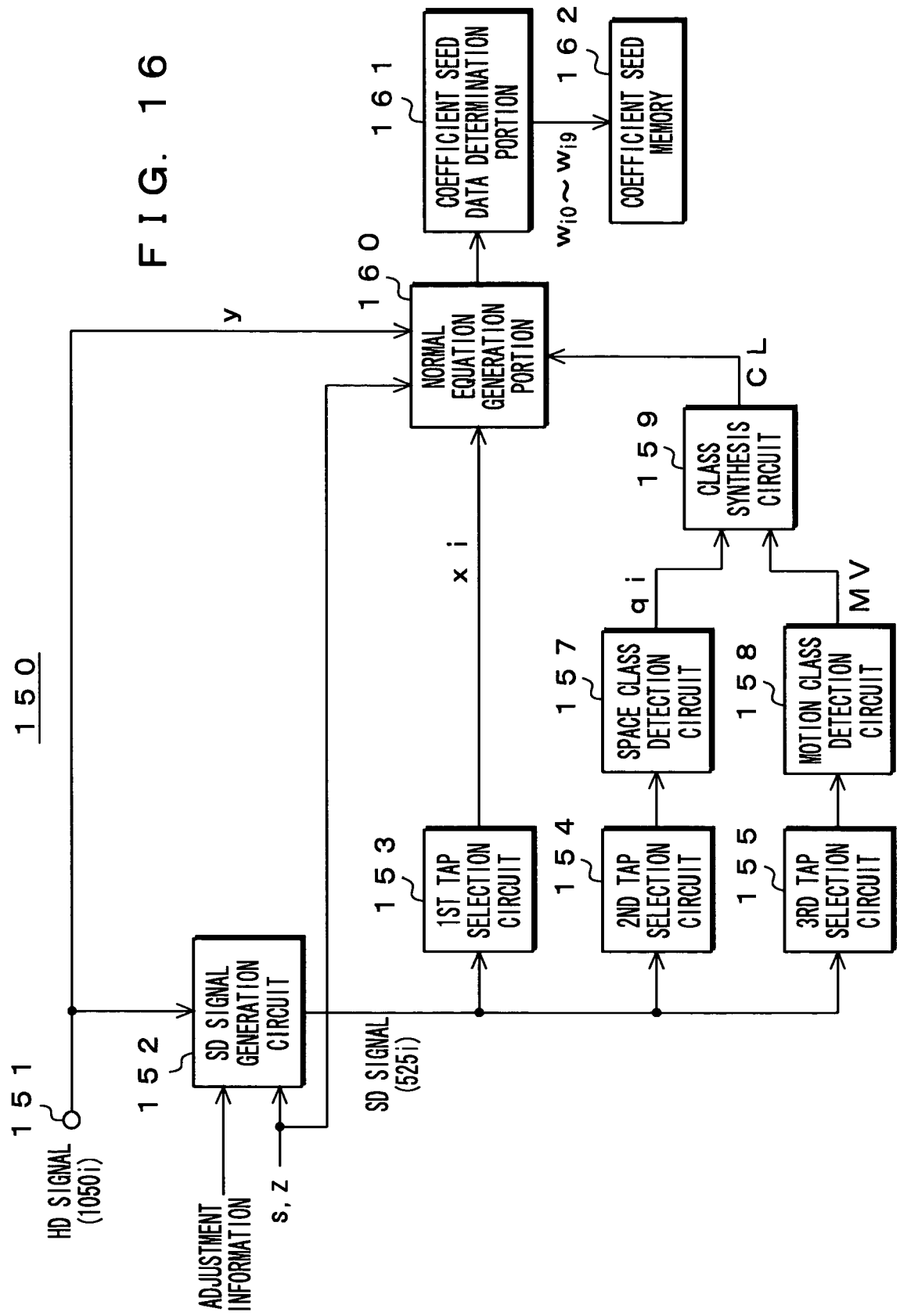
FIG. 16 is a block diagram for showing a configuration of a coefficient seed data generation device.

FIG. 16 shows a configuration of a coefficient seed data generation device 150 for generating pieces of coefficient seed data, wi0-wi9 (i=1-n) to be stored in the information memory bank 135 of the DRC circuit 18 in the above-mentioned TV receiver 10.

This coefficient seed data generation device 150 has an input terminal 151 to which an HD signal (1050i signal) as a tutor signal is input and an SD signal generation circuit 152 for performing thinning-out processing on this HD signal horizontally and vertically to obtain an SD signal as a student signal.

To this SD signal generation circuit 152, adjustment values, s and z are input which correspond to the adjustment values, s and z in the above-mentioned TV receiver 10 (see FIG. 1). In the SD signal generation circuit 152, based on these adjustment values, s and z, space-directional and time-directional bands of a band limiting filter used when generating an SD signal from an HD signal are varied.

Further, to this SD signal generation circuit 152, adjustment information (final adjustment value, history information, and environment information) which corresponds to each series of adjustments and is stored in the accumulation device 29 in the above-mentioned TV receiver 10 is input.

It is to be noted that when generating pieces of coefficient seed data, wi0-wi9 (i=1-n) to be stored in the information memory bank 135 of the DRC circuit 18 in the TV receiver 10 before it is used, none of the final adjustment value, the history information, and the environment information is stored in the accumulation device 29 yet, so that the adjustment information is not input to the SD signal generation circuit 152. That is, the adjustment information is input to the SD signal generation circuit 152 in a case where, for example, a board including the DRC circuit 18 is replaced to upgrade a version of the TV receiver 10 when generating pieces of coefficient seed data, wi0-wi9 (i=1−n) to be stored in its information memory bank 135.

The SD signal generation circuit 152, based on the adjustment information, alters input adjustment values, s and z, in accordance with which altered adjustment values, s and z the space-directional and time-directional bands are varied as described above. If the adjustment information is not input, the space-directional and time-directional bands are varied as described above in accordance with the input adjustment values, s and z themselves.

It is to be noted that in the above-mentioned TV receiver 10, the adjustment values, s and z are each adjusted by user's operations, for example, in ranges 0-8 through a predetermined step, thereby adjusting space-directional and time-directional resolutions.

In this case, if the space-directional and time-directional bands are varied in accordance with adjustment values, s and z themselves input to the SD signal generation circuit 152, in the TV receiver 10, pieces of coefficient seed data, wi0-wi9 (i=1−n) are generated so that resolutions can be adjusted in a range (space resolution of y1-y2 and time resolution of x1-x2) indicated by a solid-line frame BF in FIG. 17.

In a case where adjustment information is input, the SD signal generation circuit 152 obtains a position of the center of gravity of a final adjustment value of each of adjustment values, s and z. In the present embodiment, based on brightness information LI contained as the environment information, pieces of adjustment information through each series of adjustments are divided into plural brightness ranges, so that the position of the center of gravity of the final adjustment values is obtained for each of the brightness ranges. In this case, based on the corresponding history information, for example, a condition of waveform shapes in the above-mentioned first region SA and the second region SB, the final adjustment values are each weighted. That is, the final adjustment value decided in accordance with the history information to have higher reliability is weighted heavier. It is thus possible to improve an accuracy of the position of the center of gravity.

The SD signal generation circuit 152, for each brightness range, alters the input adjustment values, s and z based on a position of the center of gravity obtained as described above. In this case, the larger the adjustment values, s and z are, the narrower the bands become. This allows the TV receiver 10 (see FIG. 1) to make adjustments so that the larger the adjustment values, s and z, the higher may rise the resolutions.

In this case, linear transformation is performed on the input adjustment values, s and z so that a center of a changing range of adjustment values, s and z to be adjusted on the side of the TV receiver 10 may shift to an obtained center of gravity. For example, if coordinates of a center of the changing range of adjustment values, s and z to be adjusted on the side of the TV receiver 10 are (s0, z0), those of center of gravity to be obtained are (sm, zm), and the input adjustment values, s and z are s1 and z1, post-transformation adjustment values s2 and z2 are obtained by transformation equations of s2=s1+(sm−s0) and z2=z1+(zm−z0), respectively.

In a case where space-directional and time-directional bands are varied in accordance with thus transformed adjustment values, s and z, the TV receiver 10 generates pieces of coefficient seed data, wi0-wi9 (i=1−n) so that the resolution can be adjusted in a range (space resolution of y1'-y2' and time resolution of x1'-x2') indicated by a one-dot-and-dash line frame AF in FIG. 17 centered around the position of the center of gravity of the resolution adjustment positions (represented by "X") within the range indicated by a solid line frame BF in FIG. 17.

Referring to FIG. 16 again, the coefficient seed data generation device 150 has first through third tap selection circuits 153-155 for selectively taking out plural pieces of SD pixel data positioned in a periphery of a target position in an HD signal (1050i signal) from an SD signal (525i signal) output from the SD signal generation circuit 152 and outputting this data. These first through third tap selection circuits 153-155 are constituted similar to the first through third tap selection circuits 121-123 of the above-mentioned image signal processing portion 110.

Further, the coefficient seed data generation device 150 has a space class detection circuit 157 for detecting a level distribution pattern of data (SD pixel data) of a space class tap selectively taken out by the second tap selection circuit 154 and, based on this level distribution pattern, detecting a space class and outputting its class information. The space class detection circuit 157 is constituted similar to the space class detection circuit 124 of the above-mentioned image signal processing portion 110. From this space class detection circuit 157, a re-quantization code qi for each piece of SD pixel data as data of a space class tap is output as class information indicative of a space class.

Further, the coefficient seed data generation device 150 has a motion class detection circuit 158 for detecting a motion class which is mainly used to indicate a degree of a motion from data (SD pixel data) of a motion class tap selectively taken out by the third tap selection circuit 155 and outputting its class information MV. This motion class detection circuit 158 is constituted similar to the motion class detection circuit 125 of the above-mentioned image signal processing portion 110. This motion class detection circuit 158 calculates inter-frame differences from pieces of data (pieces of SD pixel data) of a motion class tap selectively taken out by the third tap selection circuit 155 and, further, performs threshold value processing on an average value of absolute values of these differences, thereby detecting a motion class which is an index of a motion.

Further, the coefficient seed data generation device 150 has a class synthesis circuit 159 for obtaining a class code CL indicative of a class to which a position of a target pixel relating to an HD signal (1050i signal) belongs, based on a re-quantization code qi as class information of a space class which is output from the space class detection circuit 157 and class information MV of a motion class which is output from the motion class detection circuit 158. This class synthesis circuit 159 is also constituted similar to the class synthesis circuit 126 of the above-mentioned image signal processing portion 110.

Further, the coefficient seed data generation device 150 has a normal equation generation portion 160. This normal equation generation portion 160 generates, for each class, a normal equation (see Equation (13)) for obtaining pieces of coefficient seed data, wi0-wi9 (i=1−n) from each piece of HD pixel data, y as pixel data of a target position obtained from an HD signal supplied to the input terminal 151, a piece of data (SD pixel data) xi of a prediction tap selectively taken out by the first tap selection circuit 153 corresponding to piece of this HD pixel data, y, adjustment values, s and z input to the SD signal generation circuit 152, and a class code CL output from the class synthesis circuit 159 corresponding to each piece of HD pixel data, y.

In this case, based on a combination of one piece of HD pixel data, y and n pieces of data (SD pixel data) xi of the prediction tap corresponding thereto, learning data is generated. In this case, in accordance with a change in the adjustment values, s and z, the space-directional band and the time-directional band at the SD signal generation circuit 152 are varied to sequentially generate plural SD signals, thereby generating each piece of learning data between the HD signal and each of the SD signals. Accordingly, the normal equation generation portion 160 generates a normal equation in which many pieces of learning data having different adjustment values, s and z are registered, from which normal equation the pieces of coefficient seed data, wi0-wi9 (i=1−n) can be obtained.

It is to be noted that in this case, the above-mentioned position of the center of gravity required for change of adjustment values, s and z input to the SD signal generation circuit 152 is sequentially changed to positions of the center of gravity that match the respective brightness ranges. Accordingly, at the normal equation generation portion 160, a normal equation for obtaining pieces of coefficient seed data, wi0-wi9 (i=1−n) is generated for each class as described above in accordance with each of the brightness ranges.

It is to be noted that in this case where learning data is generated on the basis of a combination of one piece of HD pixel data, y and n pieces of data (SD pixel data) xi of the prediction tap corresponding it, the normal equation generation portion 160 generates a normal equation for each of the output pixels (HD1-HD4 in FIG. 6 or HD1'-HD4' in FIG. 7). For example, a normal equation that corresponds to HD1 is generated from learning data constituted of such HD pixel data, y that a value of a shift with respect to a center prediction tap is in the same relationship as that with HD1.

Further, the coefficient seed data generation device 150 has a coefficient seed data determination portion 161 and a coefficient seed memory 162. The coefficient seed data determination portion 161 is supplied with data of a normal equation from the normal equation generation portion 160 and solve this normal equation by using the discharge method etc., thereby obtaining pieces of coefficient seed data, wi0-wi9 (i=1−n) for each combination of a class and an output pixel corresponding to each of the brightness ranges. The coefficient seed memory 162 stores pieces of coefficient seed data, wi0-wi9 (i=1−n) obtained by the coefficient seed data determination portion 161.

The following will describe operations of the coefficient seed data generation device 150 shown in FIG. 16.

To the input terminal 151, an HD signal (1050i signal) as a tutor signal is supplied. On the HD signal, the SD signal generation circuit 152 performs horizontal and vertical thinning-out processing to generate an SD signal (525i signal) as a student signal.

In this case, the SD signal generation circuit 152 is supplied with adjustment values, s and z for determining space-directional and time-directional bands of a band limiting filter used to generate an SD signal from an HD signal, that is, for determining space-directional and time-directional resolutions of an SD signal to be created.

Further, in a case where, for example, a board including the DRC circuit 18 is replaced to upgrade a version of the TV receiver 10 when generating pieces of coefficient seed data, wi0-wi9 (i=1−n) to be stored in its information memory bank 135, the SD signal generation circuit 152 is supplied with adjustment information (final adjustment value, history information, and environment information) in accordance with each series of adjustments, performed by the user in the past, of adjustment values s and z stored in the accumulation device 29 in this TV receiver 10.

When having received the adjustment information, the SD signal generation circuit 152 alters input adjustment values, s and z based on this adjustment information. In this case, in the SD signal generation circuit 152, a position of a center of gravity of a final adjustment value for each of the adjustment values, s and z is obtained for each of the brightness ranges. For each of the brightness ranges also, this SD signal generation circuit 152 sequentially performs sequential transformation on the input adjustment values, s and z so that the center of the changing ranges of adjustment values, s and z to be adjusted on the side of the TV receiver 10 may shift to an obtained position of a center of gravity.

When having received the adjustment information, the SD signal generation circuit 152 varies the space-directional and time-directional bands of a band limiting filter used to generate an SD signal from an HD signal as described above in accordance the adjustment values, s and z altered as described above.

It is to be noted that when generating pieces of coefficient seed data, wi0-wi9 (i=1−n) to be stored in the information memory bank 135 of the DRC circuit 18 in the TV receiver 10 before it is used, the adjustment information is not input yet, so that the space-directional and time-directional bands of the band limiting filter used to generate an SD signal from an HD signal as described above are varied in accordance with the input adjustment values, s and z themselves.

When the adjustment values, s and z input to the SD signal generation circuit 152 are thus altered sequentially, correspondingly the space-directional and time-directional bands of the band limiting filter used to generate an SD signal from an HD signal as described above are varied, so that for each of the brightness ranges, the plural SD signals are generated such that the space-directional and time-directional bands change stepwise.

Further, from an SD signal (525i signal) generated by the SD signal generation circuit 152, the second tap selection circuit 154 selectively takes out data (SD pixel data) of a space class tap positioned in a periphery of a target position in an HD signal (1050i signal). The data (SD pixel data) of the space class tap selectively taken out by this second tap selection circuit 154 is supplied to the space class detection circuit 157. This space class detection circuit 157 performs ADRC processing on each piece of the SD pixel data given as the space class tap data, to obtain a re-quantization code qi as class information of a space class (class classification mainly for representation of a waveform in a space) (see Equation (1)).

Further, from the SD signal generated by the SD signal generation circuit 152, the third tap selection circuit 155 selectively takes out data (SD pixel data) of a motion class tap positioned in the periphery of a target pixel related to the HD signal. The data (SD pixel data) of the motion class tap selectively taken out by this third tap selection circuit 155 is supplied to the motion class detection circuit 158. This motion class detection circuit 158 obtains class information MV of a motion class (class classification mainly for representation of a degree of a motion) from each piece of the SD pixel data given as motion class tap data.

This class information MV and the above-mentioned re-quantization code qi are supplied to the class synthesis circuit 159. From these motion information MV and re-quantization code qi, this class synthesis circuit 159 obtains a class code CL indicating a class to which pixel data of the target position in the HD signal (1050i signal) belongs (see Equation (3)).

Further, from an SD signal generated by the SD signal generation circuit 152, the first tap selection circuit 153 selectively takes out data (SD pixel data) of a prediction tap positioned in the periphery of the target position in the HD signal.

Then, the normal equation generation portion 160 generates, for each combination of a class and an output pixel and corresponding to each of the brightness ranges, a normal equation (see Equation (13)) for obtaining pieces of coefficient seed data, wi0-wi9 (i=1–n) from each piece of HD pixel data, y as pixel data of a target position obtained from an HD signal supplied to the input terminal 151, a piece of data (SD pixel data) xi of a prediction tap selectively taken out by the first tap selection circuit 153 corresponding to this piece of HD pixel data, y, adjustment values, s and z input to the SD signal generation circuit 152, and a class code CL output from the class synthesis circuit 159 corresponding to each piece of HD pixel data, y.

Each of these normal equations is solved by the coefficient seed data determination portion 161 to obtain pieces of coefficient seed data, wi0-wi9 (i=1–n), which are stored in the coefficient seed memory 162.

It is thus possible for the coefficient seed data generation device 150 shown in FIG. 16 to create pieces of coefficient seed data, wi0-wi9 (i=1–n) for each combination of a class and an output pixel corresponding to each of the brightness ranges. The pieces of coefficient seed data are stored in the information memory bank 135 of the DRC circuit 18 in the TV receiver 10 shown in FIG. 1.

Further, in a case where, for example, a board including the DRC circuit 18 is replaced to upgrade a version of the TV receiver 10 when generating pieces of coefficient seed data, wi0-wi9 (i=1–n) to be stored in its information memory bank 135, this coefficient seed data generation device 150 is supplied with adjustment information (final adjustment value, history information, and environment information) in accordance with each series of adjustments, performed by the user in the past, of adjustment values, s and z stored in the accumulation device 29 in this TV receiver 10.

The SD signal generation circuit 152 alters input adjustment values, s and z based on this adjustment information, based on which altered adjustment values, s and z, space-directional and time-directional bands of a band limiting filter used to obtain an SD signal from an HD signal are varied.

By storing the pieces of coefficient seed data, wi0-wi9 (i=1–n) thus obtained in the information memory bank 135 on a board including the DRC circuit 18 newly mounted each time a version of the TV receiver 10 is upgraded and using them, the user can adjust the adjustment values, s and z to adjust a resolution in a range (see the one-dot-and-dash line frame AF in FIG. 17) centered around the position of a center of gravity of the past resolution adjustments. A resolution adjustment range that matches the user preferences can be set automatically, so that the user can adjust the resolution in that range.

Further, the SD signal generation circuit 152, based on brightness information LI contained as the environment information, divides pieces of adjustment information through each series of adjustments into plural brightness ranges, so that the position of a center of gravity of the final adjustment values is obtained for each of the brightness ranges. For each of the brightness ranges this SD signal generation circuit 152 alters input adjustment values, s and z and, for each of the brightness ranges, the normal equation generation portion 160 generates a normal equation, so that pieces of coefficient seed data, wi0-wi9 (i=1–n) are obtained which correspond to each of the brightness ranges.

By storing the thus obtained pieces of coefficient seed data wi0-wi9 (i=1–n) corresponding to each of the brightness ranges in the information memory bank 135 on the board including the DRC circuit newly mounted each time the version of the TV receiver 10 is upgraded and using them, the user can adjust the adjustment values, s and z to adjust the resolution in a range (see the one-dot-and-dash line frame AF in FIG. 17) centered around the position of a center of gravity of the past resolution adjustment pieces.

It is to be noted that the above embodiment has been described with reference to an example where the acquisition device 27 is connected to the testing terminal 17 of the TV receiver 10; therefore, a final adjustment value through each series of adjustments of the adjustment values, s and z and an adjustment value in a process of changes up to this final adjustment value are acquired from the side of the body of the TV receiver 10.

It may be considered that such an acquisition device is connected to the remote-control transmitter 23 so that the above-mentioned final adjustment value through each series of adjustments of the adjustment values, s and z and adjustment value in a process of changes up to this final adjustment value may be acquired.

Figure 18:
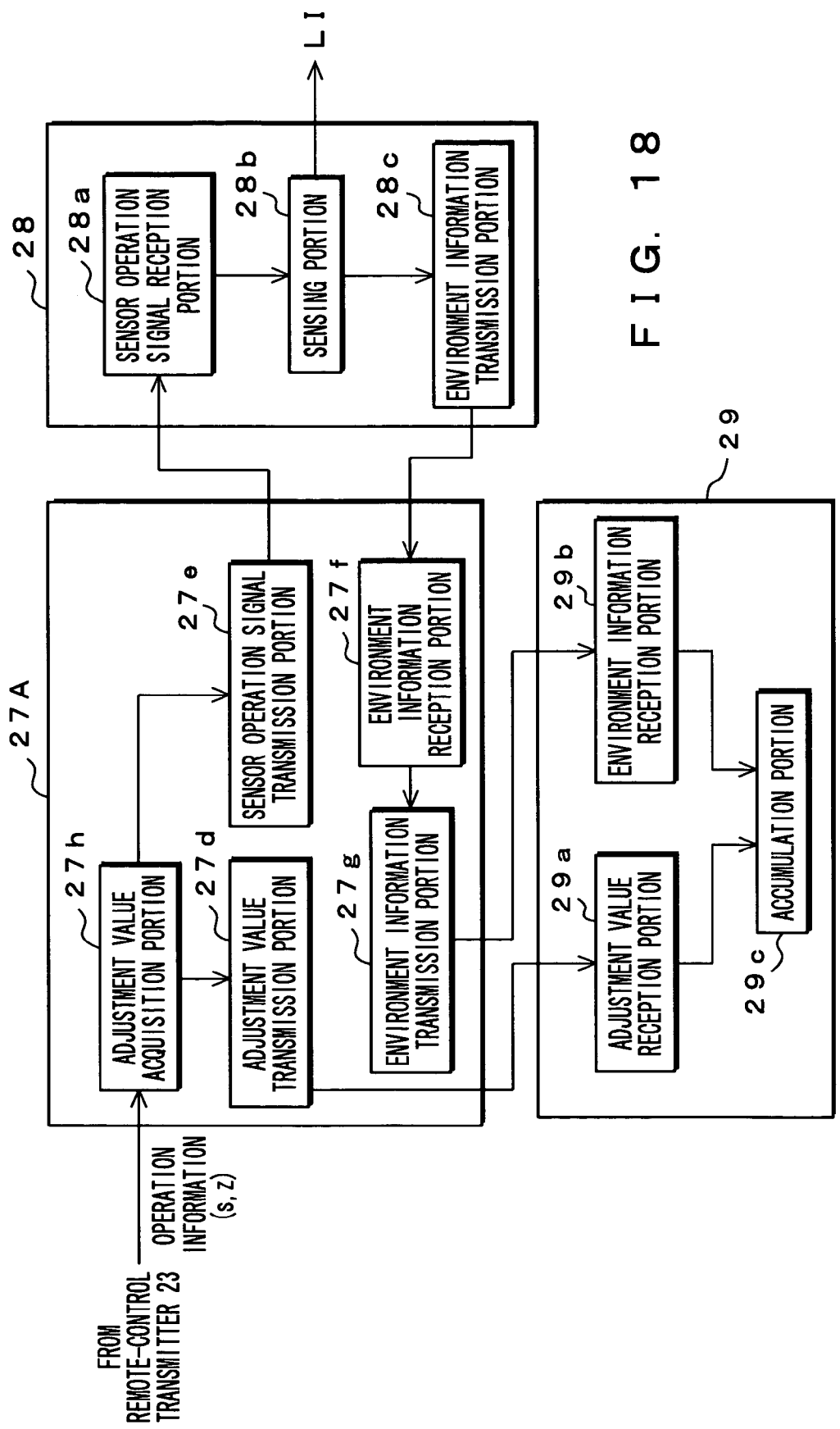
FIG. 18 is a block diagram for showing another configuration of the acquisition device, the sensor, and the accumulation device.

FIG. 18 shows a configuration of an acquisition device 27A, the sensor 28, and the accumulation device 29 in that case. Since the sensor 28 and the accumulation device 29 are the same as the sensor 28 and the accumulation device 29 respectively shown in FIG. 8, only the acquisition device 27A is explained as follows. In FIG. 18, components that correspond to those in FIG. 18 are indicated by the same reference symbols.

The acquisition device 27A comprises an adjustment value acquisition portion 27h, the adjustment value transmission portion 27d, the sensor operation signal transmission portion 27e, the environment information reception portion 27f, and the environment information transmission portion 27g.

To the adjustment value acquisition portion 27h, operation information containing the adjustment values, s and z is sent. When the adjustment values, s and z are being adjusted, the adjustment value acquisition portion 27h acquires the adjustment values, s and z periodically. The adjustment value transmission portion 27d transmits to the accumulation device 29 the adjustment values, s and z acquired by the adjustment value acquisition portion 27h. It is to be noted that time information is added to the adjustment values, s and z acquired by the adjustment value acquisition portion 27h.

When the adjustment values, s and z are acquired by the adjustment value acquisition portion 27h, the sensor operation signal transmission portion 27e transmits the sensor operation signal to the sensor 28. The environment information reception portion 27f and the environment information transmission portion 27g are the same as the environment information reception portion 27f and the environment information transmission portion 27g in the acquisition device 27 shown in FIG. 8.

Figure 19:
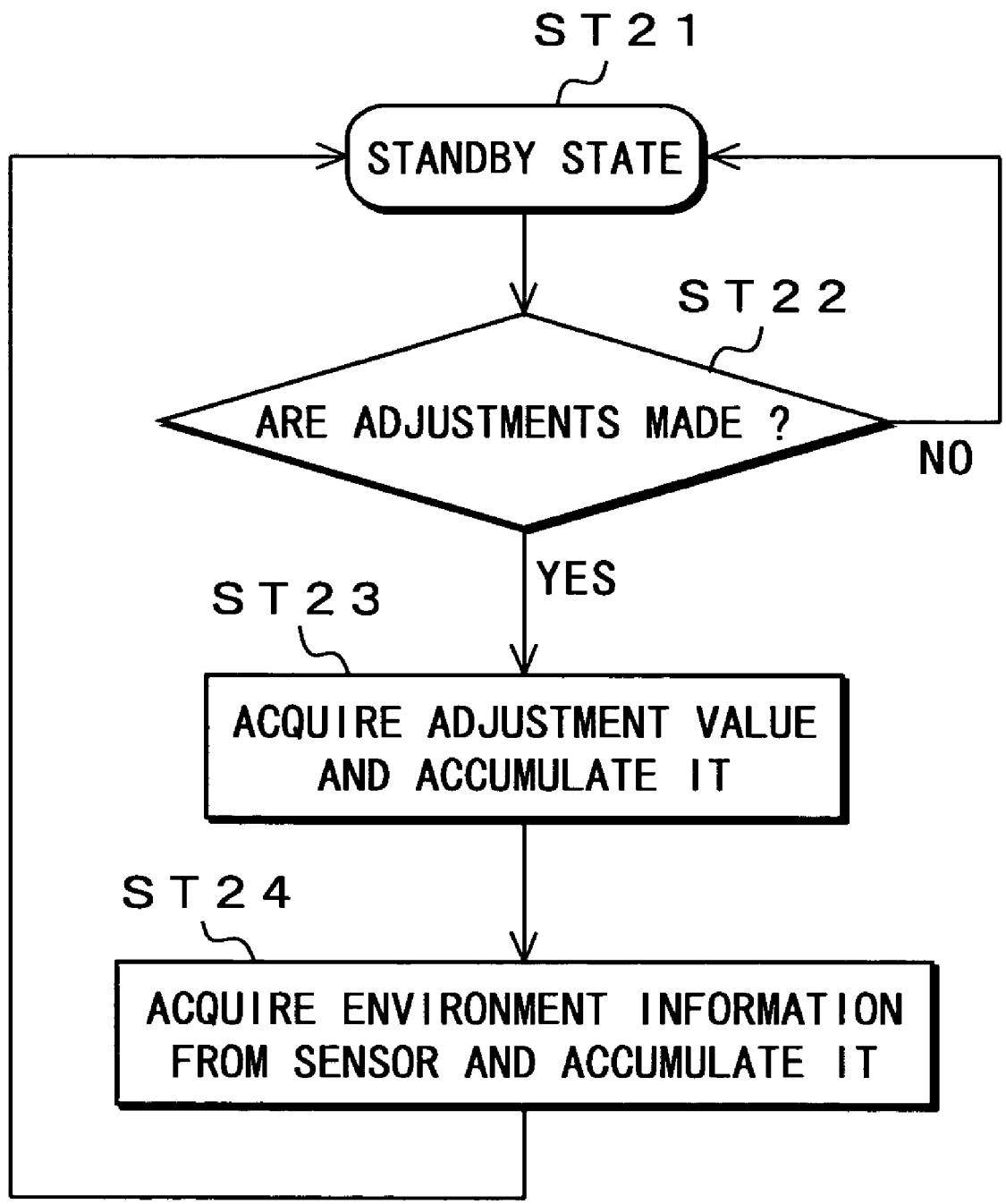
FIG. 19 is an explanatory flowchart of operations of the acquisition device (side of remote controller).

The following will describe operations of the acquisition device 27A with reference to a flowchart of FIG. 19.

The process, if in the standby state at step ST21, goes to step ST22 periodically. At step ST22, the adjustment acquisition portion 27h decides whether adjustments are being made on the basis of the adjustment information. If adjustments are not being made, it returns to the standby state of step ST21. If adjustments are being made, it goes to step ST23.

At step ST23, the adjustment value acquisition portion 27h acquires the adjustment values, s and z contained in the adjustment information and sends them to the adjustment value transmission portion 27d. In this step, time information is added to the acquired adjustment values, s and z. In this case further, when the adjustment value, s is being adjusted, it acquires this adjustment value, s and, when the adjustment value, z is being adjusted, it acquires this adjustment value, z. Furthermore, at this step ST23, the adjustment value transmission portion 27d transmits the adjustment value, s or z acquired and transmitted by the adjustment value acquisition portion 27h to the accumulation device 29 to store it therein.

Next, at step ST24, the sensor operation signal transmission portion 27e transmits the sensor operation signal to the sensor 28, the environment information reception portion 27f receives environment information transmitted from the sensor, and the environment information transmission portion 27g transmits that environment information to the accumulation device 29 to accumulate it therein. After this step ST24, the process returns to the standby state of step ST21.

If the user adjusts the adjustment values, s and z using the remote-control transmitter 23, it can be known that adjustments are being made on the basis of the operation information. Therefore, the above-mentioned acquisition device 27A also can acquire a final adjustment value through each series of adjustments of those adjustment values, s and z and an adjustment value in a process of changes up to this final adjustment value and transmit them to the accumulation device 29.

Although the above embodiment has been described with reference to an example of adjusting a space resolution and a time resolution of an image due to an HD signal (1050i signal) obtained by the DRC circuit 18, the present invention can be applied similarly to an embodiment for adjusting other picture qualities, for example, a noise suppression degree, luminance, hue, color saturation, etc. Further, the present invention can be applied similarly to an embodiment in which the informational signal is an audio signal. If the informational signal is an audio signal, a quality of an output is a sound quality, so that an increase/decrease of high and low tones, a noise suppression degree, a sound volume, etc. are adjusted.

Although in the above embodiment the brightness information LI has been supplied to the DRC circuit 18 as the environment information, the present invention is not limited to it; for example, the environment information may be noise information, audio-visual distance information, audio-visual direction information, time information, radio wave condition information, etc. In this case also, pieces of coefficient seed data, wi0-wi9 (i=1-n) corresponding to an environment condition indicated by such information are used to generate pieces of coefficient data Wi (i=1-n) in an estimate equation.

Although in the above embodiment a final adjustment value, history information, and environment information have been utilized in a case where, for example, a board including the DRC circuit 18 is replaced to upgrade the version of the TV receiver 10 when generating pieces of coefficient seed data, wi0-wi9 (i=1-n) to be stored in its information memory bank 135, they can be utilized in other cases also.

For example, they can be utilized in the case of determining an adjustment value in accordance with image contents in the TV receiver that enables changing an image resolution automatically in accordance with the image contents. In this case, a final adjustment value trough each series of adjustments related to user adjustment, history information, and environment information are stored in a storage device in a condition where they are correlated with the image contents at the time of the adjustment.

Then, when determining an adjustment value in accordance with the image contents, by, for example, weighting and averaging a plurality of final adjustment values corresponding to these image contents based on a reliability obtained from the history information, the adjustment value can be determined accurately which matches the user's preferences. Also in this case, by determining an adjustment value using only a final adjustment value that matches the current environment, such an adjustment value as to match the user's preferences further can be obtained.

Although the above embodiment has been described with an example of storing a final adjustment value through each series of adjustments, history information, and environment information in the accumulation device 29, the final adjustment value and the history information or the final adjustment value and the environment information may be stored. By doing so also, the final adjustment value can be utilized effectively by using the history information or the environment information.

The present invention, when a user makes adjustments so that a quality of an output due to an informational signal may have a predetermined quality, stores to a storage medium a final adjustment value through a series of adjustments as well as history information related to a process of changes in adjustment value up to this final adjustment value or information of an environment in the user's surroundings, to make it possible to utilize the final adjustment value more effectively, thus qualifying itself for application in an image display or an acoustic device.

While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An apparatus for processing an informational signal, said apparatus comprising:
  adjustment means for permitting a user to adjust an informational signal that is input to make a quality of an output owing to the informational signal a predetermined quality;
  storage means for storing to a storage medium a final adjustment value through a series of adjustments by means of said adjustment means and history information related to a process of changes in adjustment value up to this final adjustment value; and
  region division means for dividing the process of change in said adjustment value into a first region and a second region, said first region corresponding to a period when the user confirms changes in the quality of said output, and said second region corresponding to a period when the user adjusts to making the quality of said predetermined quality, wherein said history information includes information related to said first and second regions divided by said region division means.

2. The apparatus according to claim 1, wherein said region division means sets a time corresponding to the process in changes in said adjustment value to an overall convergence time and divides the overall convergence time at a predetermined percentage to divide the process of changes in said adjustment value into the first and second regions.

3. The apparatus according to claim 1, wherein said region division means sets the number of a wave of said adjustment value contained in the process of changes in said adjustment value as the number of overall wave and divides this number of the overall wave at a predetermined percentage to divide the process of changes in said adjustment value into said first and second regions.

4. The apparatus according to claim 1, wherein said region division means divides the process of changes in said adjustment value into a first half region including the wave of said adjustment value having at least a predetermined amplitude value as said first region and a second half region including only the wave of said adjustment value having said amplitude less than the predetermined value as said second region.

5. The apparatus according to claim 1, further comprising operating means which is operated at a timing to start an adjustment for making the quality of said output a predetermined quality after the user has completely confirmed changes in the quality of said output,
wherein the region division means divides the process of changes in said adjustment value into said first and second regions based on an output signal from said operation means.

6. The apparatus according to claim 1, wherein said storage means acquires said final adjustment value and said history information from said adjustment means.

7. The apparatus according to claim 1, further comprising transmission means for remote-controlling adjustment at said adjustment means,
wherein said storage means acquires said final adjustment value and said history information from said transmission means.

8. The apparatus according to claim 1, further comprising information acquisition means for acquiring information on an environment in surroundings of the user,
wherein the storage means adds said information on the environment acquired by said information acquisition means to the final adjustment value through said series of adjustments and said history information when said series of adjustments are performed to store the pieces of information and the final adjustment value.

9. An apparatus for processing an informational signal, said apparatus comprising:
an adjustment unit for permitting a user to adjust the informational signal that is input to make a quality of an output owing to the informational signal a predetermined quality;
a storage unit for storing to a storage medium a final adjustment value through a series of adjustments by means of said adjustment unit and history information related to a process of changes in adjustment value up to this final adjustment value; and
a region division unit for dividing the process of changes in said adjustment value into a first region and a second region, said first region corresponding to a period when the user confirms changes in the quality of said output, and said second region corresponding to a period when the user adjusts to making the quality of said output said predetermined quality, wherein said history information includes information related to said first and second regions divided by said region division unit.

10. A method for processing an informational signal, said method comprising the steps of:
permitting a user to adjust the informational signal that is input, utilizing an input unit, to make a quality of an output owing to the informational signal a predetermined quality;
storing to a storage medium a final adjustment value through a series of adjustments by said user adjustment step and history information related to a process of changes in adjustment value up to the final adjustment value;
dividing, utilizing a digital circuit, the process of changes in said adjustment value into a first region and a second region, said first region corresponding to a period when the user confirms changes in the quality of said output, and said second region corresponding to a period when the user adjusts to making the quality of said output said predetermined quality, wherein said history information includes information related to said first and second regions.

11. A computer-readable medium storing a computer program, the program comprising the steps of:
permitting a user to adjust the informational signal that is input to make a quality of an output owing to the informational signal a predetermined quality;
storing to a storage medium a final adjustment value through a series of adjustments by said user adjustment step and history information related to a process of changes in adjustment value up to this final adjustment value; and
dividing the process of changes in said adjustment value into a first region and a second region, said first region corresponding to a period when the user confirms changes in the quality of said output, and said second region corresponding to a period when the user adjusts to making the quality of said output said predetermined quality, wherein said history information includes information related to said first and second regions.

12. An apparatus for processing an informational signal, said apparatus comprising:
adjustment means for permitting a user to adjust the informational signal that is input to make a quality of an output owing to the informational signal a predetermined quality;
information acquisition means for acquiring information on an environment in surroundings of the user;
storage means for storing to a storage medium a final adjustment value through a series of adjustments by means of said adjustment means and said environment information acquired by said information acquisition means when this series of adjustments have been made, with them being paired with each other; and
region division means for dividing the process of changes in said adjustment value into a first region and a second region, said first region corresponding to a period when the user confirms changes in the quality of said output, and said second region corresponding to a period when the user adjusts to making the quality of said output said predetermined quality, wherein said history information includes information related to said first and second regions divided by said region division means.

13. A method for processing an informational signal, said method comprising the steps of:
permitting a user to adjust the informational signal that is input, utilizing an input unit, to make a quality of an output owing to the informational signal a predetermined quality;
acquiring information, utilizing an acquisition unit, of an environment in surroundings of the user;
storing to a storage medium a final adjustment value through a series of adjustments by said user adjustment step and said environment information acquired by said information acquisition step when the series of adjustments have been made, with the adjustments being paired with each other; and dividing, utilizing a digital circuit, the process of changes in said adjustment value into a first region and a second region, said first region corresponding to a period when the user confirms changes in the quality of said output, and said second region corresponding to a period when the user adjusts to making the quality of said output said predetermined quality, wherein said history information includes information related to said first and second regions.

14. A computer-readable medium storing a computer program, the program comprising the steps of:

permitting a user to adjust the informational signal that is input to make a quality of an output owing to the informational signal a predetermined quality;

acquiring information of an environment in surroundings of the user;

storing to a storage medium a final adjustment value through a series of adjustments by said user adjustment step and said environment information acquired by said information acquisition step when this series of adjustments have been made, with them being paired with each other; and dividing the process of changes in said adjustment value into a first region and a second region, said first region corresponding to a period when the user confirms changes in the quality of said output, and said second region corresponding to a period when the user adjusts to making the quality of said output said predetermined quality, wherein said history information includes information related to said first and second regions.

15. An informational signal processing apparatus comprising:

an adjustment unit for permitting a user to adjust an informational signal that is input to make a quality of an output owing to the informational signal a predetermined quality;

an information acquisition unit for acquiring information on an environment in surroundings of the user;

a storage unit for storing to a storage medium a final adjustment value through a series of adjustments by means of said adjustment unit and said environment information acquired by said information acquisition unit when this series of adjustments have been made, with them being paired with each other; and a region division unit for dividing the process of changes in said adjustment value into a first region and a second region, said first region corresponding to a period when the user confirms changes in the quality of said output, and said second region corresponding to a period when the user adjusts to making the quality of said output said predetermined quality, wherein said history information includes information related to said first and second regions divided by said region division unit.

* * * * *